(12) United States Patent
Richter et al.

(10) Patent No.: US 8,116,301 B2
(45) Date of Patent: Feb. 14, 2012

(54) METHOD AND APPARATUS FOR MULTIPLE MEDIA DIGITAL COMMUNICATION SYSTEM

(75) Inventors: Andreas Richter, Philadelphia, PA (US); Ogden Cartwright Reed, Jr., Philadelphia, PA (US)

(73) Assignee: RPX Corporation, San Francisco, CA (US)

( * ) Notice: Subject to any disclaimer, the term of this patent is extended or adjusted under 35 U.S.C. 154(b) by 959 days.

(21) Appl. No.: 11/484,200

(22) Filed: Jul. 10, 2006

(65) Prior Publication Data

US 2006/0274655 A1    Dec. 7, 2006

Related U.S. Application Data

(63) Continuation of application No. 10/804,776, filed on Mar. 19, 2004, now Pat. No. 7,075,924, which is a continuation of application No. 09/596,835, filed on Jun. 19, 2000, now Pat. No. 6,738,357, which is a continuation of application No. 09/437,269, filed on Nov. 10, 1999, now Pat. No. 6,104,706, which is a continuation of application No. 08/795,798, filed on Feb. 5, 1997, now Pat. No. 5,995,491, which is a continuation of application No. 08/626,580, filed on Apr. 2, 1996, now Pat. No. 5,623,490, which is a continuation of application No. 08/073,956, filed on Jun. 9, 1993, now abandoned.

(51) Int. Cl.
*H04L 12/56* (2006.01)

(52) U.S. Cl. ........................................ 370/352; 715/753

(58) Field of Classification Search .................. 370/352; 715/753
See application file for complete search history.

(56) References Cited

U.S. PATENT DOCUMENTS 3,584,142 A    6/1971    Schoeffler
(Continued)

FOREIGN PATENT DOCUMENTS

CA    2080530    4/1994
(Continued)

OTHER PUBLICATIONS

Leung, Wu-Hon F., et al., "A Software Architecture for Workstations Supporting Multimedia Conferencing in Packet Switching Networks," IEEE Journal on Selected Areas in Communications, vol. 8, No. 3, pp. 380-390.

(Continued)

*Primary Examiner* — Melvin Marcelo
(74) *Attorney, Agent, or Firm* — Howison & Arnott, L.L.P.

(57) ABSTRACT

The present invention is embodied in a digital communication system where multiple media data sources are time multiplexed into a packetized data stream, each packet having an assigned priority and the packetized data stream transmitted in substantially the order of assigned priority. At both the transmit side, and the receive side, audio packets are given priority processing over video packets, which in turn have priority over text/graphics data packets. Continuous real time audio playback is maintained at the receiver by delaying the playback of received audio in a first in/first out (FIFO) buffer providing a delay at least equal to the predicted average packet delay for the communication system. Optionally, the average system delay is continuously monitored, and the audio playback delay time is adjusted accordingly. Audio playback is slowed or accelerated in order to shrink or grow the difference in time between the sender and receiver. In another aspect of the invention, a conference of three or more callers is created by broadcasting a common packetized data stream to all conference callers.

42 Claims, 16 Drawing Sheets

U.S. PATENT DOCUMENTS

| | | | |
|---|---|---|---|
| 4,100,377 A | 7/1978 | Flanagan | |
| 4,387,271 A | 6/1983 | Artom | |
| 4,506,358 A | 3/1985 | Montgomery | |
| 4,507,781 A | 3/1985 | Alvarez, III et al. | |
| 4,516,156 A | 5/1985 | Fabris et al. | 358/85 |
| 4,525,779 A | 6/1985 | Davids et al. | |
| 4,574,374 A | 3/1986 | Scordo | |
| 4,627,052 A | 12/1986 | Hoare et al. | |
| 4,645,872 A | 2/1987 | Pressman et al. | |
| 4,650,929 A | 3/1987 | Boerger et al. | |
| 4,653,090 A | 3/1987 | Hayden | |
| 4,686,698 A | 8/1987 | Tompkins et al. | |
| 4,707,831 A | 11/1987 | Weir et al. | 370/94 |
| 4,710,917 A | 12/1987 | Tompkins et al. | |
| 4,734,765 A | 3/1988 | Okada et al. | |
| 4,748,620 A | 5/1988 | Adelmann et al. | |
| 4,756,019 A | 7/1988 | Szybicki | |
| 4,760,572 A | 7/1988 | Tomikawa | |
| 4,763,317 A | 8/1988 | Lehman et al. | |
| 4,823,122 A * | 4/1989 | Mann et al. | 340/825.28 |
| 4,827,339 A | 5/1989 | Wada et al. | |
| 4,847,829 A | 7/1989 | Tompkins et al. | 370/62 |
| 4,849,811 A | 7/1989 | Kleinerman | |
| 4,882,743 A | 11/1989 | Mahmoud | |
| 4,888,795 A | 12/1989 | Ando et al. | |
| 4,893,326 A | 1/1990 | Duran et al. | |
| 4,897,866 A | 1/1990 | Majmudar et al. | |
| 4,905,231 A | 2/1990 | Leung et al. | |
| 4,918,718 A | 4/1990 | Emmons et al. | |
| 4,924,311 A | 5/1990 | Ohki et al. | |
| 4,932,047 A | 6/1990 | Emmons et al. | |
| 4,935,953 A | 6/1990 | Appel et al. | 379/53 |
| 4,937,856 A | 6/1990 | Natarajan | |
| 4,942,470 A | 7/1990 | Nishitani et al. | 358/160 |
| 4,942,540 A | 7/1990 | Black et al. | |
| 4,942,569 A | 7/1990 | Maeno | 370/60 |
| 4,943,994 A | 7/1990 | Ohtsuka et al. | |
| 4,945,410 A | 7/1990 | Walling | 358/141 |
| 4,949,169 A | 8/1990 | Lumelsky et al. | 358/86 |
| 4,953,159 A | 8/1990 | Hayden | |
| 4,953,196 A | 8/1990 | Ishikawa | |
| 4,962,521 A | 10/1990 | Komatsu et al. | |
| 4,965,819 A | 10/1990 | Kannes | |
| 4,991,169 A | 2/1991 | Davis et al. | 370/77 |
| 4,991,171 A | 2/1991 | Teraslinna et al. | |
| 4,995,071 A | 2/1991 | Weber et al. | 379/53 |
| 5,003,532 A | 3/1991 | Ashida et al. | |
| 5,014,267 A | 5/1991 | Tompkins et al. | 370/62 |
| 5,034,916 A | 7/1991 | Ordish | |
| 5,042,006 A | 8/1991 | Flohrer | |
| 5,042,062 A | 8/1991 | Lee et al. | |
| 5,046,079 A | 9/1991 | Hashimoto | |
| 5,046,080 A | 9/1991 | Lee et al. | |
| 5,056,136 A | 10/1991 | Smith | |
| 5,062,136 A | 10/1991 | Gattis et al. | |
| 5,072,442 A | 12/1991 | Todd | |
| 5,077,732 A | 12/1991 | Fischer et al. | |
| 5,079,627 A | 1/1992 | Filo | |
| 5,083,269 A | 1/1992 | Syobatake et al. | 370/85.6 X |
| 5,099,510 A | 3/1992 | Blinken, Jr. et al. | |
| 5,101,451 A | 3/1992 | Ash et al. | |
| 5,132,966 A | 7/1992 | Hayano et al. | 370/85.6 X |
| 5,136,581 A | 8/1992 | Muehrcke | |
| 5,140,584 A | 8/1992 | Suzuki | 370/85.6 X |
| 5,155,594 A | 10/1992 | Birnstein et al. | 358/136 |
| 5,157,662 A | 10/1992 | Tadamura et al. | |
| 5,177,604 A | 1/1993 | Martinez | 358/86 |
| 5,192,999 A | 3/1993 | Graczyk et al. | |
| 5,195,086 A | 3/1993 | Baumgartner et al. | 370/62 |
| 5,200,951 A | 4/1993 | Grau et al. | |
| 5,210,836 A | 5/1993 | Childers et al. | 395/375 |
| 5,220,653 A | 6/1993 | Miro | 395/275 |
| 5,231,492 A | 7/1993 | Dangi et al. | 358/143 |
| 5,241,625 A | 8/1993 | Epard et al. | |
| 5,243,596 A | 9/1993 | Port et al. | 370/60 X |
| 5,276,679 A | 1/1994 | McKay et al. | |
| 5,283,638 A | 2/1994 | Engberg et al. | |
| 5,291,492 A | 3/1994 | Andrews et al. | |
| 5,297,143 A | 3/1994 | Fridrich et al. | |
| 5,309,433 A | 5/1994 | Cidon et al. | 370/60 |
| 5,311,585 A | 5/1994 | Armstrong et al. | |
| 5,315,586 A | 5/1994 | Charvillat | |
| 5,323,445 A | 6/1994 | Nakatsuka | |
| 5,341,374 A | 8/1994 | Lewen et al. | |
| 5,355,371 A | 10/1994 | Auerbach et al. | |
| 5,371,534 A | 12/1994 | Dagdeviren et al. | |
| 5,373,549 A | 12/1994 | Bales et al. | |
| 5,375,068 A | 12/1994 | Palmer et al. | |
| 5,392,344 A | 2/1995 | Ash et al. | |
| 5,422,883 A | 6/1995 | Hauris et al. | |
| 5,432,525 A | 7/1995 | Maruo et al. | |
| 5,537,548 A | 7/1996 | Fin et al. | 395/200.04 |
| 5,594,859 A | 1/1997 | Palmer et al. | 395/330 |
| 5,623,490 A | 4/1997 | Richter et al. | |
| 5,995,491 A | 11/1999 | Richter et al. | |
| 6,104,706 A | 8/2000 | Richter et al. | |

FOREIGN PATENT DOCUMENTS

| | | |
|---|---|---|
| EP | 0279232 A2 | 8/1988 |

OTHER PUBLICATIONS

Boudec, J. Y Le, "The Asynchronous Transfer Mode: A Tutorial," Computer Works and ISDN Systems, vol. 24, No. 4, (May 15, 1992), pp. 279-309.

Clifford J. Weinstein & James W. Forgie "Experience with Speech Communication in packet networks", IEEE Journal on Selected Areas in Communications, Special issue on *Packet switched voice and data communication*, 1(6), Dec. 1983.

D. Cohen "Specifications for the Network Voice Protocol", ISI/RR-75-39, USC/Information Sciences Institute (4676 Admiralty Way, Marina del Rey, CA 90292), Mar. 1976, Available from DTIC (AD #A023506).

RFC741 D. Cohen, "Specifications for the Network Voice Protocol NVP", RFC 741, Nov. 1977.

D. T. Magill, "Adaptive speech compression for packet communication systems", *Conference record of the IEEE National Telecommunications Conference*, pp. 29D-1-29D-5, 1973.

William L. Holbert "A layered Protocol for Packet Voice and data Integration" IEEE Journal on Selected Areas in Communications, Special issue on *Packet switched voice and data communication*, 1(6), Dec. 1983.

Giulo Barberis et al. "Coded Speech in Packet-switched Networks: Models and Experiments", IEEE Journal on Selected Areas in Communications, Special issue on *Packet switched voice and data communication*, 1(6), Dec. 1983.

Hiromi Ueda et al. "Evaluation of an Experimental Packetized Speech and Data Transmission System", IEEE Journal on Selected Areas in Communications, Special issue on *Packet switched voice and data communication*, 1(6), Dec. 1983.

Jeffrey M. Musser et al. "A Local Area Network as a Telephone Local Subscriber Loop", IEEE Journal on Selected Areas in Communications, Special issue on *Packet switched voice and data communication*, 1(6), Dec. 1983.

H. Schulzrine, "A Transport Protocol for Real Time Applications", Internet Draft, Dec. 15, 1992.

H. Schulzrine, "A Transport Protocol for Real Time Applications", Internet Draft, May 6, 1993.

Stephen Casner and Stephen Deering "First IETF Internet Audiocast" ACM SIGCOMM Computer Communications Review, vol. 22, No. 3, Jul. 1992.

Montgomery, W.A.: "Techniques for Packet Voice Synchronization", IEEE Journal on Selected Areas in Communications, vol. SAC-1, No. 6, Dec. 1983 (pp. 1022-1028).

"Adaptive Audio Playout Algorithm for Shared Packet Networks", IBM Technical Disclosure Bulletin, vol. 36, No. 4, Apr. 1993, Armonk, NY, US (pp. 255-257).

"A Packet-switched Multimedia Conferencing System" by Eve M. Schooler and Stephen L. Casner, Reprinted from the ACM SIGOIS Bulletin, vol. 1, No. 1, pp. 12-22 (Jan. 1989), University of Southern California, Information Sciences Institute, (12 pages).

"A Distributed Architecture for Multimedia Conference Control" by Eve M. Schooler, ISI Research Report, ISI/RR-91-289 (Nov. 1991), University of Southern California, Information Sciences Institute, (20 pages).

"An Architecture for Multimedia Connection Management" by Eve M. Schooler and Stephen L. Casner, Reprinted from the Proceedings IEEE 4th Comsoc International Workshop on Multimedia Communications, MM '92, pp. 271-274, Monterey, CA (Apr. 1992), University of Southern California, Information Sciences Institute, (6 pages).

"The Connection Control Protocol: Specification", Version 1.1, by Eve M. Schooler, USC/Information Sciences Institute, (Jan. 29, 1992), (pp. 1-29).

"The Connection Control Protocol: Architecture Overview", Version 1.0, by Eve M. Schooler, USC/Information Sciences Institute, (Jan. 28, 1992), (pp. 1-6).

"A Dual-Ring Lan for Integrated Voice/Video/Data Services" by Jon W. Mark and Byoung-Joon Lee, Dept. of Electrical and Computer Engineering, and Computer Communications Networks Group, Univ. of Waterloo, Waterloo, Ontario, Canada, (1990 IEEE) (pp. 850-857).

IBM Technical Disclosure Bulletin, vol. 32, No. 11, (Apr. 1990), Output Throttle Mechanism, (pp. 274-279), supplied by the British Library, www.bl.uk.

E. Brian Came "Modern Telecommunication" pp. 44-47 1984.

J. J. Degan et al., "Fast Packet Technology for Future Switches", AT&T Technical Journal, vol. 68, No. 2, Mar./Apr. 1989, pp. 36-50.

S. Nojima et al., "High Speed Packet Switching Network for Multi-Media Information", Proceedings of IEEE 1986 Computer Networking Symposium, pp. 141-150.

K. Yukimatsu et al., "Multicast Communication Facilities in a High Speed Packet Switching Network", Proceedings of ICCC'86, pp. 276-281, 1986.

E. Arthurs et al., "The Architecture of a Multicast Broadband Packet Switch", Proceedings of IEEE INFOCOM'88, pp. 1-8, 1988.

K. Y. Eng et al., "Multicast and Broadcast Services in a Knockout Packet Switch", Proceedings of IEEE INFOCOM'88, pp. 29-34, 1988.

J. S. Turner, "Design of a Broadcast Packet Switching Network", IEEE Trans. on Communications, vol. 36, No. 6, 1988, pp. 734-743.

W. H. Leung et al., "A Set of Operating System Mechanisms to Support Multi-Media Applications", Proceedings of 1988 International Zurich Seminar on Digital Communications, Mar. 1988, pp. B4.1-B4.6.

Glafoor et al., "An Efficient Communication Structure for Distributed Commit Protocols", IEEE Journal on Selected Areas in Communications, vol. 7, No. 3, Apr. 1989, pp. 375-389.

S. E. Minzer et al., "New Direction in Signaling for Broadband ISDN", IEEE Communications Magazine, Feb. 1989, pp. 6-14.

L. Aguilar et al. "Architecture for a Multimedia Teleconferencing System", Proceedings ACM SIGCOMM'86 Symposium, Aug. 1986, pp. 126-136.

S. R. Ahuja et al., "The Rapport Multimedia Conferencing System", Proceedings of Conference on Office Information Systems, Mar. 1988, pp. 1-8.

H. Forsdick, "Explorations into Real-Time Multimedia Conferencing", Proceedings of the 2nd International Symposium on Computer Message Systems, IFIP, Sep. 1985, pp. 331-347.

K. A. Lantz, "An Experiment in Integrated Multimedia Conferencing", Proceedings of the Conference on Computer-Supported Cooperative Work'86, Dec. 1986, pp. 533-552.

A. Poggio et al., "CCWS: A Computer-Based, Multimedia Information System", Computer, Oct. 1985, pp. 92-103.

The Rapport Multimedia Conferencing Sys—A Software Overview, Ensor et al. Mar. 10, 1988.

"Distributed Desktop Conferencing Sys (Mermaid) Based on Group Architecture", Maeno et al., Jun. 28, 1991.

"Distributed Desktop Conferencing System With Multiuser Multimedia Interface", Watabe et al. May 1991.

Ultrix Worksystem Software X Window System Protocol: X Version 11, Digital Equipment Corporation, Order No. AA-MA98A-TE (1988).

OSF/Motif Programmer's Guide, Revision 1.1, Open Software Foundation, (Englewood Cliffs, NJ: Prentice Hall) (1990, 1991).

Palmer and Palmer, "Desktop Meeting", LAN Magazine, 6(11):111-121 (Nov. 1991).

D. Comer, "Internetworking with TCP/IP, vol. I: Principles, Protocols, and Architecture", 2nd Edition, pp. 1-8, 337-346, 505 (Prentice Hall: Englewood Cliffs, New Jersey 1991).

C. Nicolaou, "an Architecture for Real-Time Multimedia Communication Systems", IEEE Journal on Selected Areas in Communications, vol. 8, No. 3, Apr. 1990, pp. 391-400.

E. Schooler, "Conferencing and Collaborative Computing", Multimedia Systems, vol. 4, 1996, pp. 210-225.

S. Shenker et al, "Managing Shared Ephemeral Teleconferencing State: Policy and Mechanism", Lecture notes in computer science, vol. 882, 69, 1994.

E. Schooler, "Case Study: Multimedia Conference Control in a Packet-switched Teleconferencing System", Reprinted from the Journal of Internetworking: Research and Experience, vol. 4, No. 2, Jun. 1993, pp. 99-120.

E. Schooler, "Multimedia Conferencing: Has it come of age?", IEEE Journal on Selected Areas in Communications, 1991, pp. 707-716.

S. Casner et al., "N-Way Conferencing with Packet Video", Reprinted from the Proceedings of The Third International Workshop on Packet Video held Mar. 22-23, 1990 in Morristown, NJ, ISI Reprint Series, ISI/RS-90-252, Apr. 1990, pp. 1-6.

E. Schooler et al., "A Scalable Multicast Architecture for One-to-many Telepresentations", Mutimedia Computing and Systems, Proceedings, IEEE International Conference, 1998, pp. 128-139.

Gemmell et al., "an Architecture for Multicast Telepresentations", Journal of Computing and Information Technology—CIT, vol. 6, No. 3, pp. 255-272.

M. Chen et al., "Designing a Distributed Collaborative Environment," Communication for Global Users, including a Communications Theory Mini Conference, Orland, Dec. 6-9, 1992, Institute of Electrical and Electronics Engineers, p. 213-219.

W.H. Leung et al., Multimedia Conferencing Capabilities in an Experimental Fast Packet Network, Proceedings of the International Switching Symposium, Yokohama, Oct. 25, 1992, Institute of Electronics, Information and Communication Engineers, pp. 258-262.

Dynamic Conference Call Participation, IBM Technical Bulletin, pp. 1135-1138, Aug. 1985.

R. Bubenik et al., Mutipoint Connection Management in High Speed Networks, INFOCOM, 1991, pp. 59-67.

C. Kim et al., "Performance of Call Splitting Algorithms for Multicast Traffic", INFOCOM, 1990, pp. 348-356.

* cited by examiner

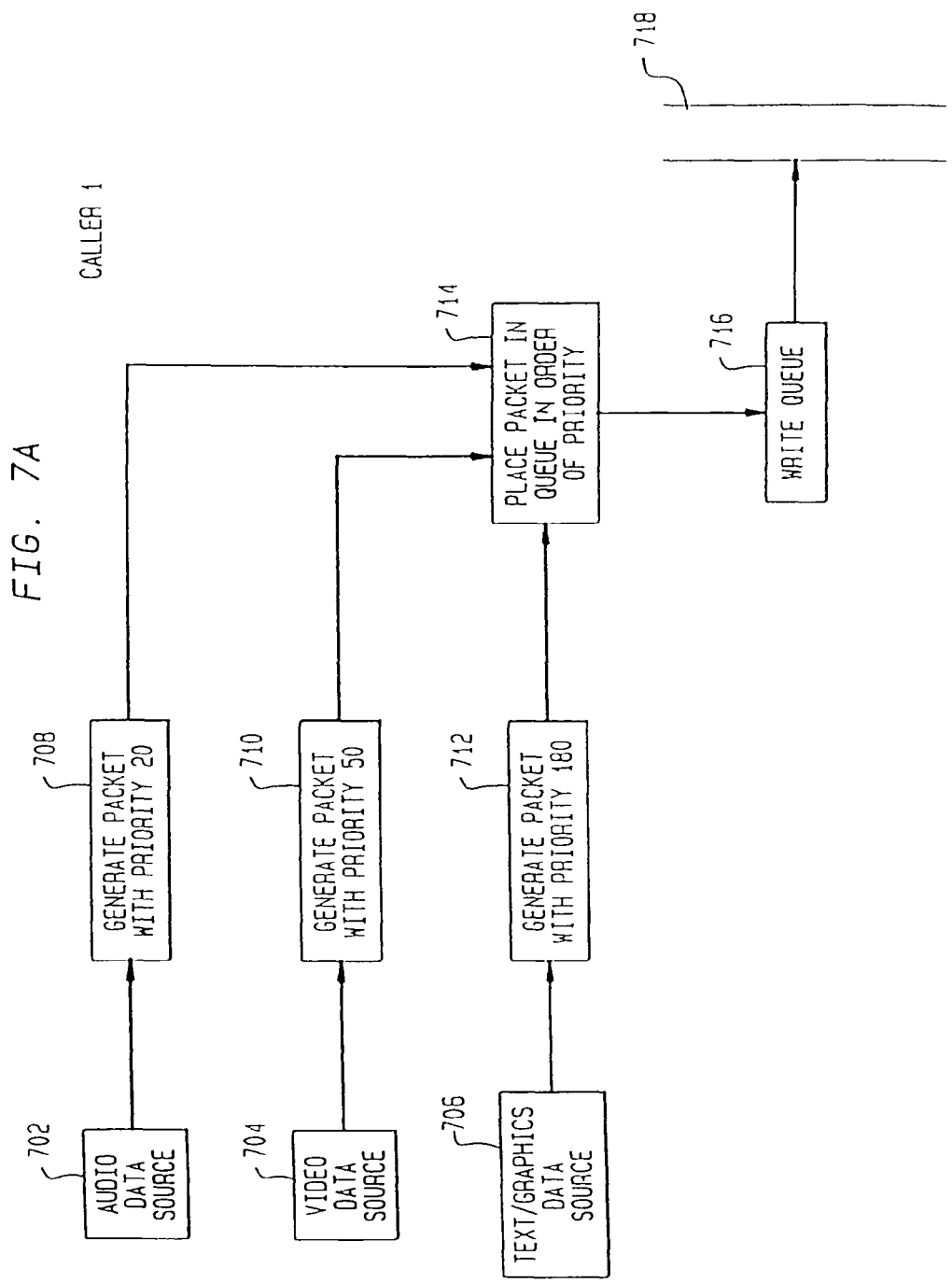

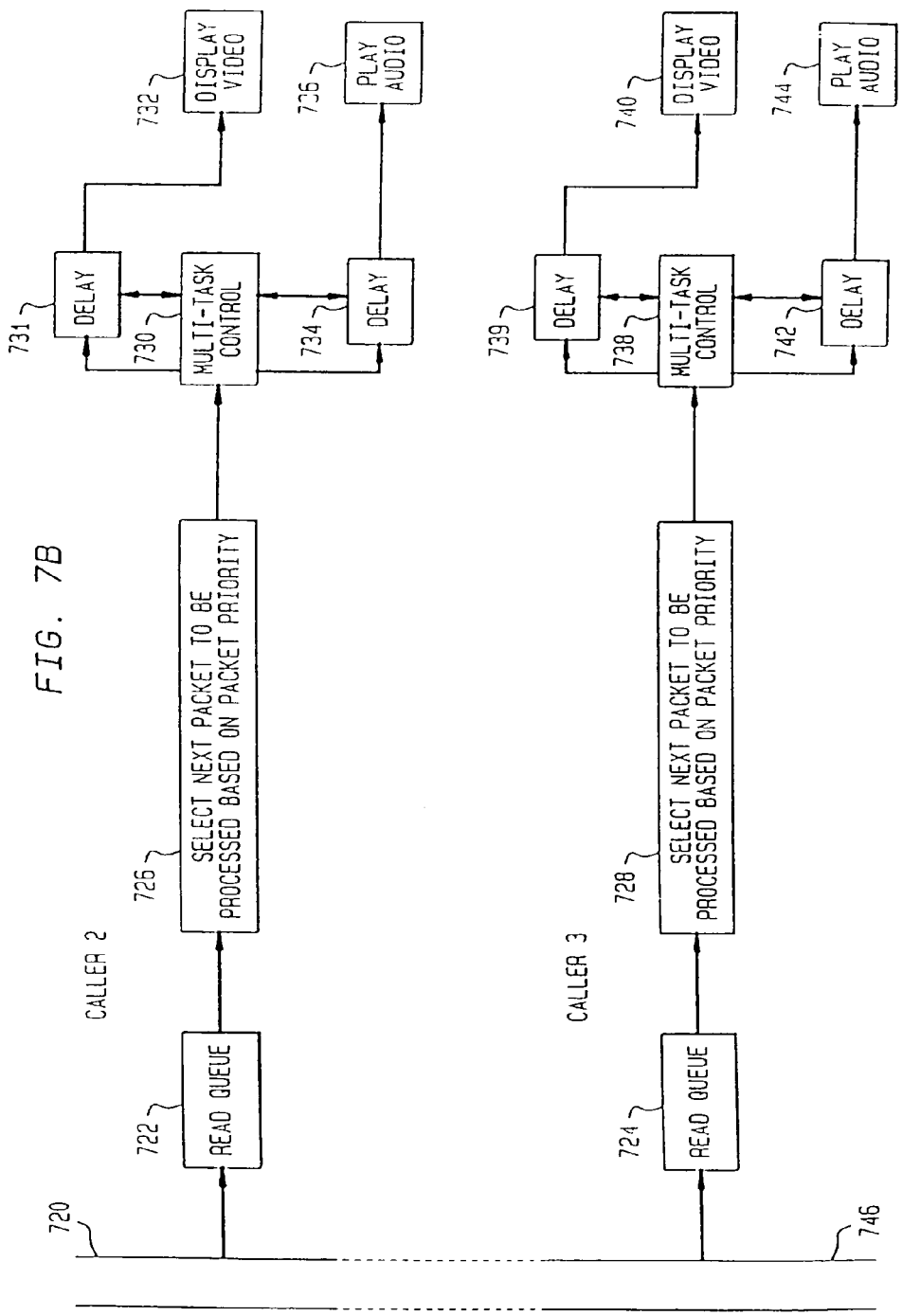

METHOD AND APPARATUS FOR MULTIPLE MEDIA DIGITAL COMMUNICATION SYSTEM

The present application is a continuation of application Ser. No. 10/804,776 filed Mar. 19, 2004 of the same title, now U.S. Pat. No. 7,075,924, which is a continuation of application Ser. No. 09/596,835 filed Jun. 19, 2000 of the same title, now U.S. Pat. No. 6,738,357, which is a continuation of prior application Ser. No. 09/437,269 filed Nov. 10, 1999, now U.S. Pat. No. 6,104,706, which is a continuation of Ser. No. 08/795,798 filed Feb. 5, 1997, now U.S. Pat. No. 5,995,491, which is a continuation of Ser. No. 08/626,580 filed Apr. 2, 1996, now U.S. Pat. No. 5,623,490, which is a continuation of Ser. No. 08/073,956, filed Jun. 9, 1993, now abandoned. This application is related to co-owned application Serial No. 10/847,782 filed Jun. 22, 2004 entitled "Apparatus for Multiple Media Digital Communication", now U.S. Pat. No. 7,050,425.

FIELD OF THE INVENTION

The present invention relates to the field of digital communications systems, and more particularly to systems transporting multiple media (multimedia) and/or communicating such multimedia through a plurality of connections to multiple callers.

BACKGROUND OF THE INVENTION

In the prior art, multimedia communications, such as videoconferencing systems for providing two way video and audio, are well known. Given sufficient bandwidth and dedicated independent channels, (e.g. 6 Mhz for an analog video channel, 3 Khz for an audio link over a standard analog telephone line, etc), videoconferencing between two callers can be realized. However, communication channels providing 6 Mhz video bandwidth are not generally or universally available. A major obstacle to wide spread implementation and acceptance of multiple media conferencing systems is the limited bandwidth of the available communication channels. In addition, typical communication channels available on packet switched networks such as AppleTalk, from Apple Computer, California, USA, or Netware from Novell Inc, Oregon, USA, do not provide the continuous real time analog or digital connection of a telephone line or modem. Instead, packet switched networks provide non-real time bursts of data in the form of a switched packet containing a burst of digital data. Thus, in addition to bandwidth limitations, packet switched networks present delay limitations in implementing real time multiple media conferencing systems. The same bandwidth and time delay limitations which apply to all time division multiple access (TDMA) communication systems and similar schemes present obstacles to achieving real time multimedia communications.

Typically, the problem of videoconferencing two callers is approached by compressing the composite video signal so that the resulting transmitted data rate is compatible with the available communication channel, while permitting acceptable video and audio to be received at the other end of the communication channel. However, solutions in the past using lossy compression techniques, have been limited to compromising quality in order to obtain acceptable speed. Recently, non-lossy compression techniques have become available. The problem still remains as to how to match the bandwidth and timing constraints of available digital formats to the available communication channels, both present and future.

SUMMARY OF THE INVENTION

The present invention is embodied in a digital communication system where multiple media data sources are time multiplexed into a packetized data stream. At both the transmit side, and the receive side, audio packets are given priority processing over video packets, which in turn have priority over text/graphics data packets. Continuous real time audio playback is maintained at the receiver by delaying the playback of received audio in a first in/first out (FIFO) buffer providing a delay at least equal to the predicted average packet delay for the communication system. Optionally, the average system delay is continuously monitored, and the audio and video playback delay time as well as audio and video qualities are adjusted accordingly. In another embodiment of the invention, a conference of three or more callers is created by broadcasting a common packetized data stream to all conference callers. Use of the present invention further permits an all software implementation of a multimedia system.

1. In accordance with a first aspect of the present invention, multiple data sources forming data packets are combined into a prioritized data stream.

The present invention is embodied in a method and apparatus for combining data from a plurality of media sources into a composite data stream capable of supporting simultaneous transmission including multiple video and graphic signals and real time audio. Video, audio and other signals are integrated in a non-standard transmission format determined by a novel streaming algorithm and prioritization scheme designed to provide the best balance between transmission quality and realization of real time rendition of each.

For example, each data type packet at the transmitter is assigned a priority between 0 and 10000, with 0 being the highest priority and 10000 the lowest. An audio packet is given priority 20, a video packet is given priority 50. Screen data packets and file data transfer packets are both given priority 180.

Before transmission on the communication channel, packets are placed in a queue according to priority order. As new packets are generated, the queue is reorganized so that the new packet is placed into its proper priority order.

At the receiver, each task runs according to its assigned priority. Packets with priorities between 0 and 100 are processed first, to the exclusion of packets with priorities 101 through 10000. Audio, being the highest priority (20), is processed first to the exclusion of all other packets. Within the class of packets with priorities between 101 and 10000, packets are processed according to relative priority. That is, higher priority tasks do not completely shut out tasks of lower priority. The relationship among priorities is that a priority 200 task runs half as often as a priority 100 task. Conversely, a priority 100 task runs twice as often as priority 200 task. Tasks with priorities between 0 and 100 always run until completion. Thus, video, screen data and file data, processing tasks are completed after audio processing in accordance with the relative priority of the packets.

A multi-tasking executive dynamically reassigns task priorities, to efficiently complete all tasks within the available time, while performing the highest priority tasks first. At any given time, there are different tasks all at different priorities, all yielding to each other. In general, a task yields to a higher priority task, if it is not running an uninterruptable sequence. If the current task completes its cycle, its priority is reassigned to a lower priority. If the priority of two or more tasks is equal, then the multi-tasking executive executes each task in a round robin fashion, performing a portion of each task, until the completion of all tasks with the same priority.

The assignment of packet priorities, and processing according to priority assures that audio will be given precedent over video, while audio and video will be given precedent over both screen data and file transfer data.

As indicated above, continuous real time audio playback is maintained at the receiver by delaying the playback of received audio in a first in/first out (FIFO) buffer having a size at least equal to the predicted average packet delay for the communication system. Optionally, the delay of the audio FIFO may be made variable. A variable delay audio FIFO buffer at the receiver allows the system to shrink or grow the time delay between one machine and the other. The ability to shrink or grow the difference in time between the sender and receiver permits the system of the present invention to compensate for indeterminate system delays. If the changes are slight, the difference in pitch is not noticeable. For greater changes, the technique of audio resampling may be used to increase or decrease the rate of audio playback without changing the pitch of audio content.

Similarly, video playback continuity at the receiver may also be improved by delaying the playback of received video in a first in/first out (FIFO) buffer having a size at least equal to the predicted average packet delay for the communication system. The delay of the video FIFO may be made variable, allowing the system to shrink or grow the time delay between one machine and the other to compensate for indeterminate system delays. Again, if the changes are slight, the change in frame rate is not noticeable. However, video data does not age as quickly as audio data. Therefore a smaller video FIFO can be used. Also, a video image may have short discontinuities without a perceived loss of the video connection. Audio playback, on the other hand, is more sensitive to discontinuities, and it is more important to maintain continuity at the receiver. Ideally, when both audio and video are used in a multimedia conference, the delay for audio and video should be equal to make sure that they are synchronized. In the latter case, the actual system delay is calculated by finding the maximum delay of both audio and video packets.

Data from media sources tend to come in bursts. For example, audio data rates rise when speaking, and fall to zero during a silence. In the present embodiment, the silence between words provides the present system with an opportunity to catch up by refilling the audio FIFO buffer before it empties. In such manner, the present system compensates for the delay inherent in a packet switched, time delay variant, communication channel.

Similarly, video sources including graphic screen data, are generated in bursts. That is, the data rate for video ideally falls to zero when there is no motion. The data rate for transmitting screen graphics falls to zero when are no changes. When the caller changes the screen, (such as the collaborative work document displayed on the screen), data is generated.

Thus, following the priority scheme of the present invention, video is updated only when no speech data is being processed. However, processing of speech data does not included the playing of sound. Once the sound starts playing, there is no need to further spend time to process the sound. Sound playing needs no supervision. Therefore, video updating occurs while sound is playing. After speech is playing close to real time (with a delay), video text and graphics are updated in the background. Video, text, graphics and data files are updated at lesser priorities. Except for audio and video data, task priorities are re-assigned to assure that all tasks will be completed, and that a higher priority task will not completely prevent the lower priority tasks from being completed.

2. In accordance with a second aspect of the present invention, multiple signal packets are broadcast to a plurality of callers to create a common multimedia conference.

In addition to assigned priorities, data packets having multiple destination addresses are broadcast over a plurality of connections to multiple callers. Each caller receives the same data packets with assigned priorities, and processes the received packets in a similar manner. As new data is generated from each caller in the video conference, new data packets are broadcast to the other callers. Thus, due to the broadcast of data packets representing audio, video and screen data, all callers are conferenced together, each seeing and hearing each other, while discussing the same screen document. Additional callers can be added to the conference over a plurality of connections without adding undue burden, because in a conference, each caller needs to generate data only once, which is then transimtted either simultaneously or sequentially depending on the kind of connection, to other callers.

3. In accordance with a third aspect of the present invention data received on a first communication medium (for example on a broadband local area network, such as ethernet) are re-broadcast on a different communication medium (such as a telephone line) in order to conference callers on the different communication media in a common multimedia conference. The present invention thereby provides the option of desktop videoconferencing on standard computer networks and telephone lines.

BRIEF DESCRIPTION OF THE DRAWINGS

FIG. 7A is a block diagram of a multiple media communication system transmitter in accordance with the present invention.

FIG. 7B is a block diagram of a multiple media communication system receiver in accordance with the present invention.

DETAILED DESCRIPTION

Figure 1A:
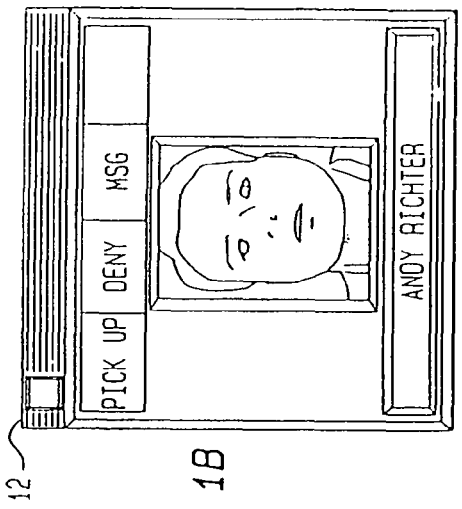
FIG. 1A is a dialog box indicating connection status as it would appear on the screen of a Macintosh computer used in conjunction with the present invention.
Figure 1B:
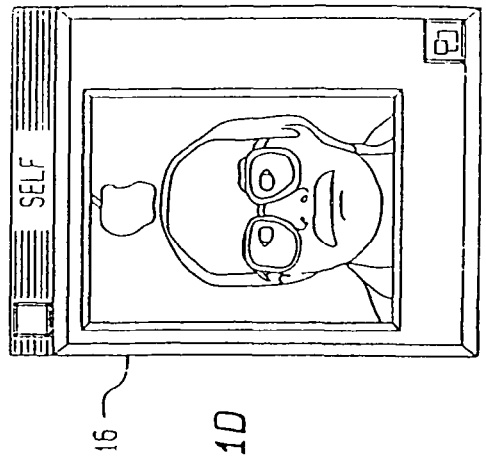
FIG. 1B is a dialog box indicating an incoming call as it would appear on the screen of a Macintosh computer used in conjunction with the present invention.
Figure 1C:
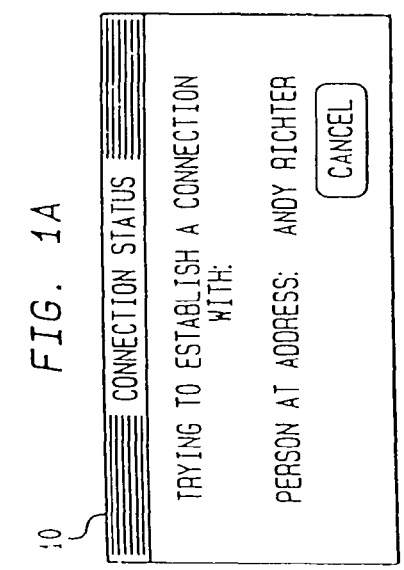
FIG. 1C is a dialog box illustrating the connection status message that would appear for a call that was not accepted as it would appear on the screen of a Macintosh computer used in conjunction with the present invention.
Figure 1D:
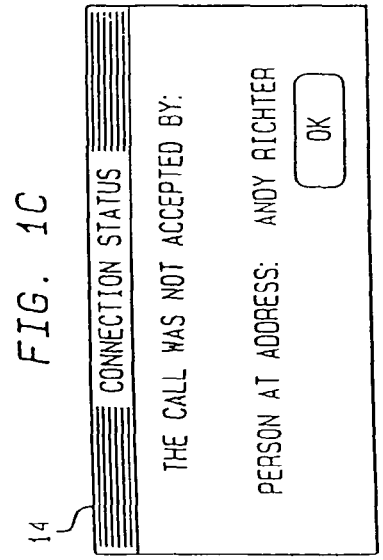
FIG. 1D is a window containing a moving video image as it would appear on the screen of a Macintosh computer used in conjunction with the present invention.

From the viewpoint of the caller, the present multimedia communication system operates as follows:

A caller on a desktop computer initiates a multimedia call by selecting a media type and desired connection with a second party. A dialog box of the type shown in FIG. 1A appears on the screen, illustrating the connection status. Caller 2, who receives the call, views a dialog box on his screen of the type illustrated in FIG. 1B to announce an arriving call. Caller 2 has the option of deciding to either pick up or deny the call, or to take a message. If the call is denied by caller 2, then caller 1 views a dialog box 14 as illustrated in FIG. 1C. For purposes of illustration, a video box 16 containing a video of the first caller 1 is shown in FIG. 1D. If the caller decides to take a message, caller 2 can now control the connection and optionally send an announcement message requesting a message.

Figure 2:
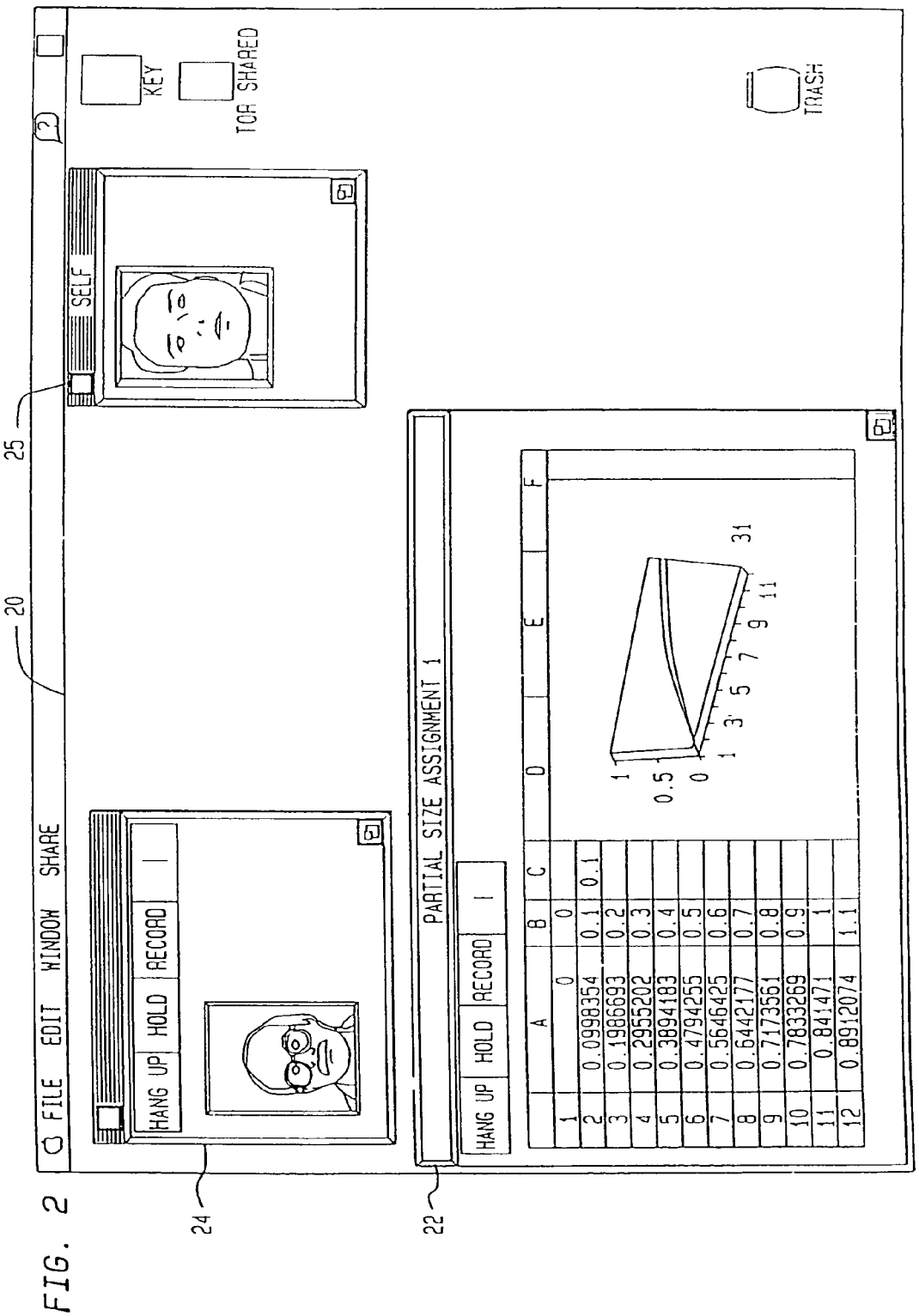
FIG. 2 is a video screen illustrating a video conference between two callers and sharing a common document.

FIG. 2 illustrates the screen appearance of a typical multimedia call with a collaborative document. On the screen 20 of caller 1, a video box 24 appears in which a moving video showing caller 2 appears. The screen of caller 2 is similar, but contains the image and sound of caller 1. On both the screens of callers 1 and 2 can be a collaborative document 22. Caller 1 and caller 2 are connected by moving video and two way audio and can discuss collaborative document. Caller 1 may manipulate the document and the changes will appear on the screen of caller 2. In an alternate embodiment, caller 2 may manipulate the document as well.

Figure 3:
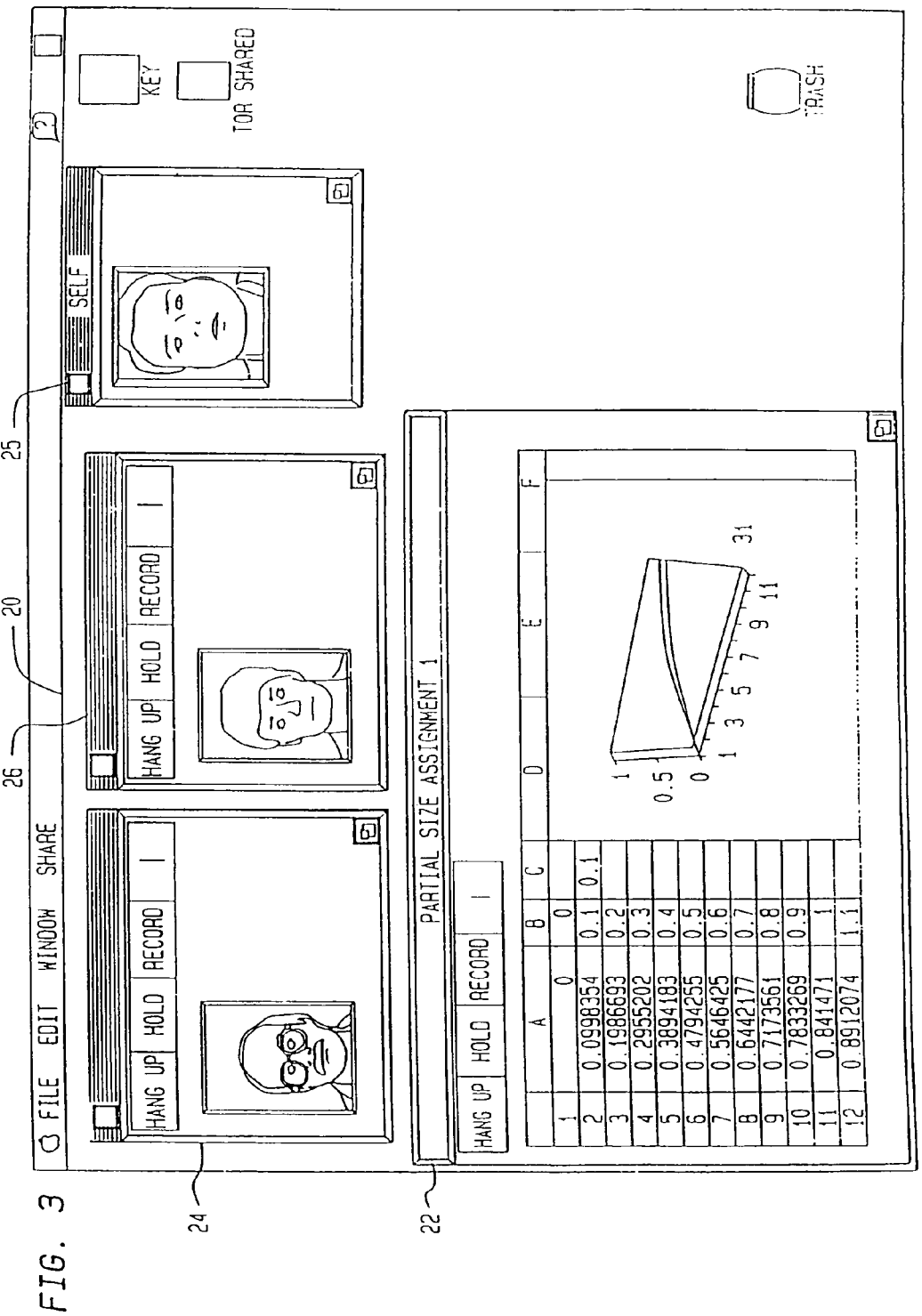
FIG. 3 is a video screen illustrating a video conference between three callers and sharing a common document.

FIG. 3 illustrates the screen 20 appearance of a three party video conference as it appears to caller 1. Caller 3 appears in a video box 26 as well as caller 2 in another video box 26, and the collaborative document 22. The other callers 2 and 3 see the other two members of their video conference on their screen as well as collaborative document 22. The size and position of video boxes 24 and 26 is selectable by caller 1. A video image 25 of caller 1 may also appear on the screen of caller 1 to let caller 1 see what is being transmitted. Reducing the size of video box 25 reduces the amount of (video) data which must be transmitted by the communication system.

Connection Establishment

Figure 4:
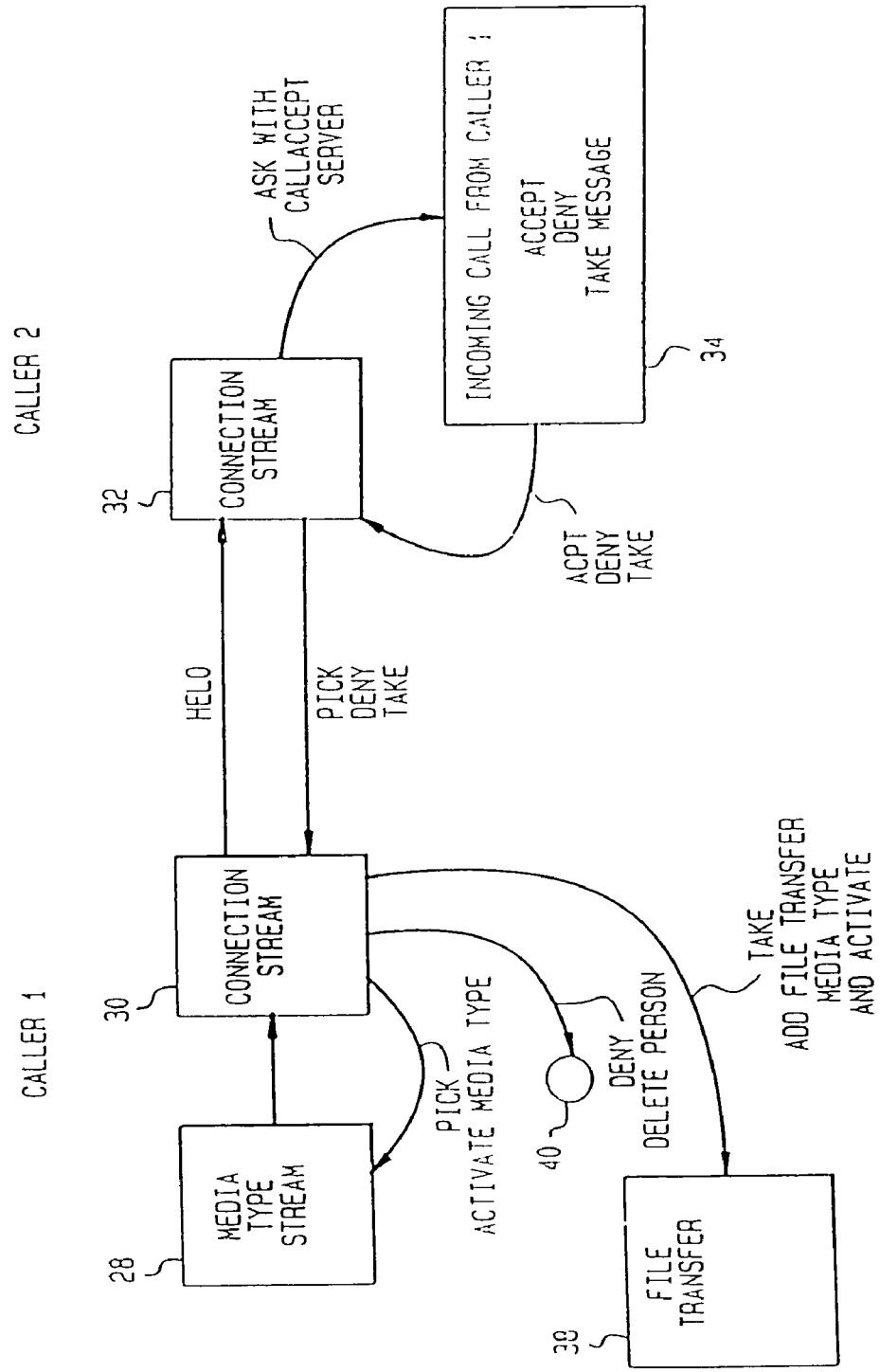
FIG. 4 is a block diagram illustrating the sequence of operations for establishing a connection in a multiple media digital communication system embodying the present invention.

The sequence of operation for establishing a connection between caller 1 and caller 2 over a communication network is illustrated in FIG. 4. The network may typically be AppleTalk, ethernet or any other commonly available local area network. Also, a connection can be established over a telephone line or other proprietay digital telephone lines such as ISDN.

The terms, "connection stream" and "media stream" used below are further defined in the description of FIGS. 8-11. For present purposes, such terms may be regarded as routines for handling data packets. Caller 1 selects a media type stream 28, and a connection stream 30, suitable for the communication medium. An initial message termed a helo packet is sent to a caller 2 connection stream 32. The connection stream 32 provides a dialog box to caller 2 informing that there is an incoming call from caller 1. Caller 2 can then decide 34 to either accept or deny the call, or alternatively to take a message if caller 2 is not present. The accept, deny and take commands are communicated back to the connection stream 32 which sends a return message across the communication system back to connection stream 30 and caller 1.

In addition to denying or taking the call, caller 2 has the option to pick a different media type. That is, for example, if the media type stream 28 of caller 1 is video, and caller 2 does not want to accept a video call but will accept an audio call, then the return message pick will indicate that caller 2 is picking audio as the media for an incoming call. At caller 1, connection stream 30 distributes the response from caller 2. Specifically, if the call is denied then the connection attempt is deleted 40. If a different media is picked, then a modification of the media type stream 28 is performed. If take a message was selected, then the appropriate file transfer 38 takes place to transmit an announcement file, and a message is requested to be sent back.

Figure 5:
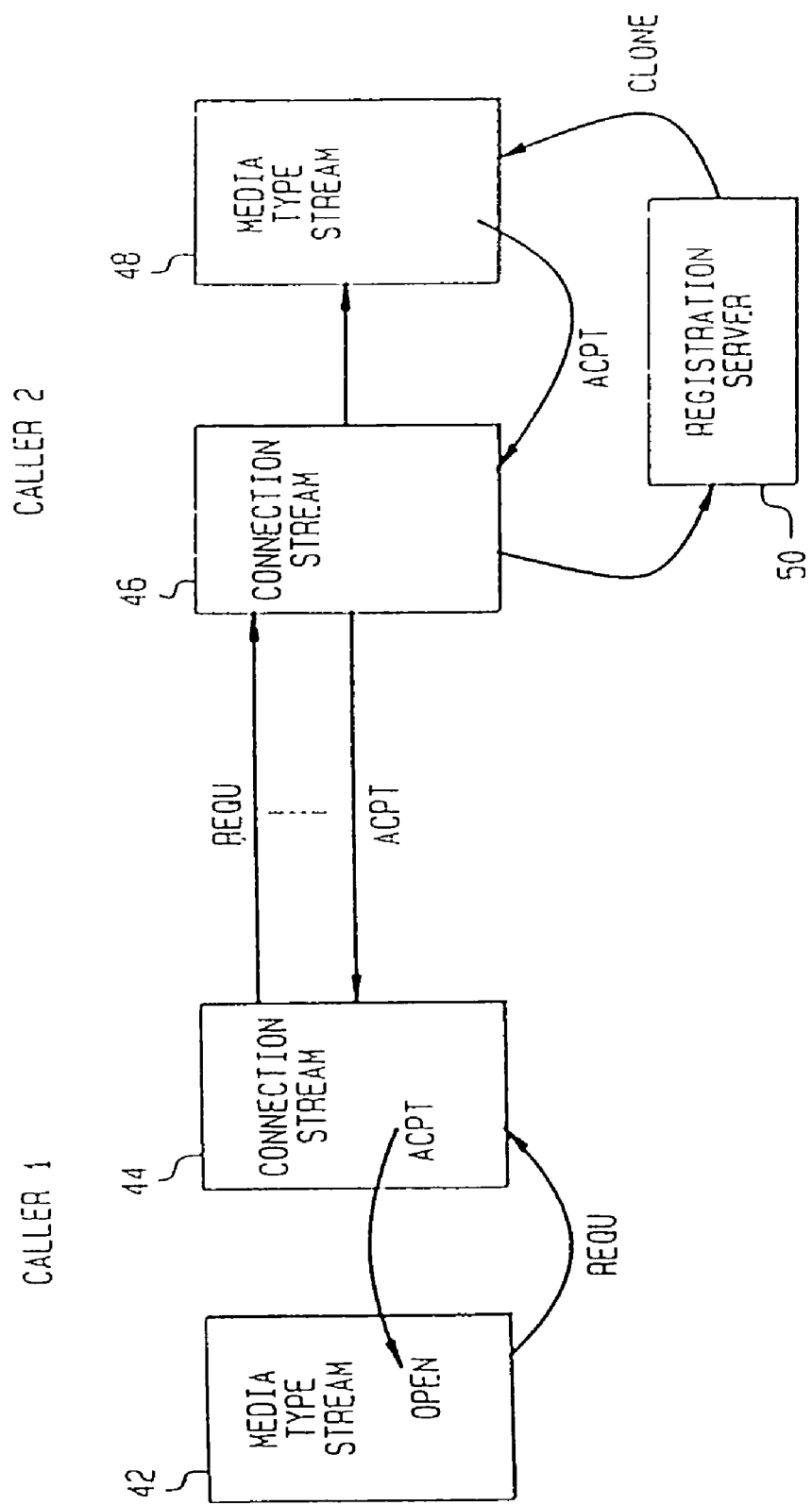
FIG. 5 is a block diagram illustrating the sequence of operations for establishing media types to be used in a conference call in a multiple media digital communication system embodying the present invention.

FIG. 5 illustrates the communication sequence for selecting the among the various media types between caller 1 and caller 2. For media type stream 42, a request is sent through connection stream 44 across the communication channel to caller 2 at connection stream 46 which is forwarded to media type stream 48. Caller 2 configures itself to accept the media type stream which is being presented to it by modification of its registration server 50 which clones the desired media type. If accepted, media type stream 48 sends a message through connection stream 46 across the communication medium to caller 1. The acceptance is received at connection stream 44 and communicated to media type stream 42 which opens up the connection for the given media type between caller 1 and caller 2.

Data Format in Packets with Priority and Multiple Destinations

Figure 6:
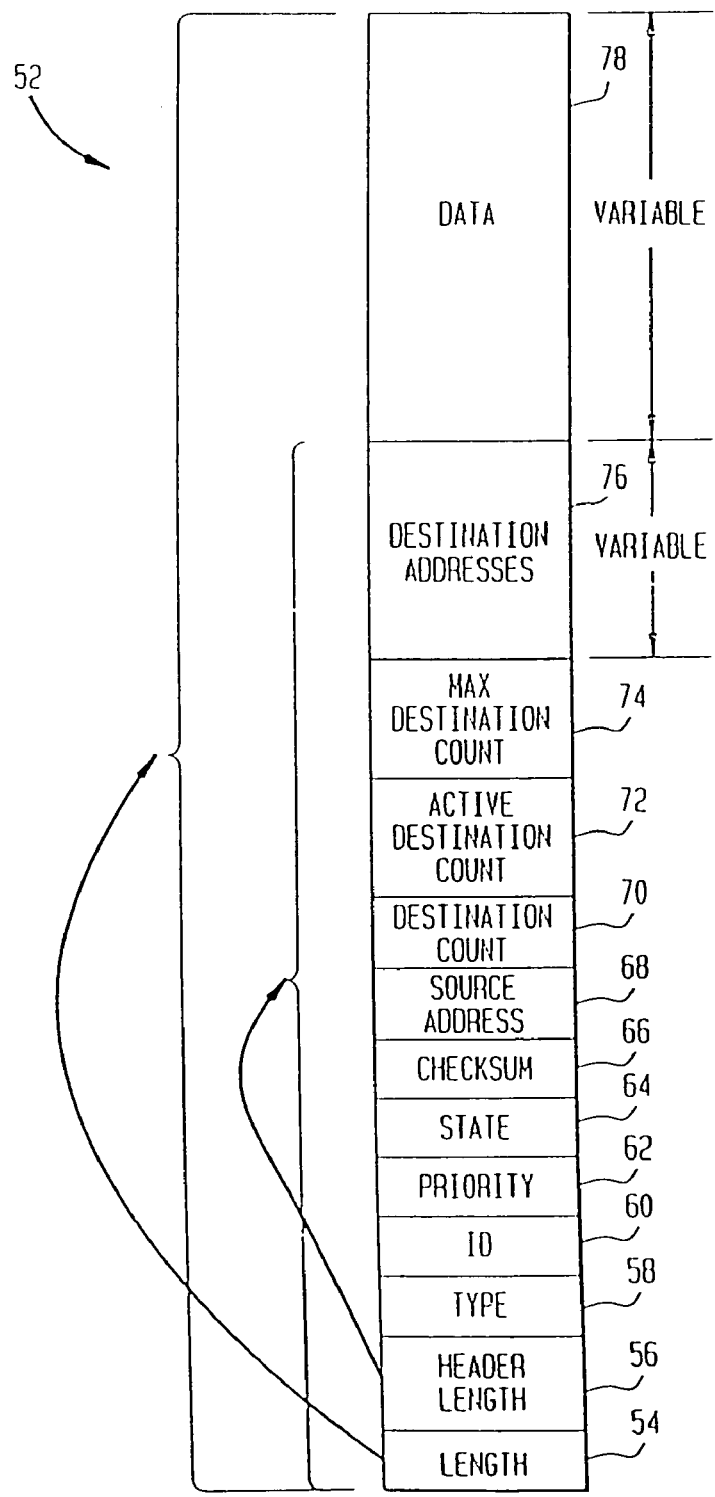
FIG. 6 is an illustration of a packet data format used in conjunction with the present invention.

FIG. 6 shows a packet data format 52 suitable for use in conjunction with the present invention. The length of the packet is indicated by data field 54. The length of the header is indicated by data field 56. The packet type and identification are respectively indicated by data fields 58 and 60.

The priority of the data packet is indicated in data field 62. When transporting multiple media digital data packets, the priority data field determines which of the packets has the highest priority in processing. Data fields 64 and 66 respectively contain information as to the message state, and a checksum for determining message errors. The packet source address is indicated at data field 68, and a destination count as to the number of destinations this packet will reach is indicated at data field 70. Also, an active destination count, the number of destination which have not yet received this packet, and a maximum destination count is provided in data fields 72 and 74 respectively.

The data packet 52 of FIG. 6 contains a number of destination addresses 76. The plural destination addresses provides a broadcast capability by which all the callers in a conference call can view common documents and see and hear each other. That is, when a data packet 52 contains audio data representing one speaker's voice, that packet is broadcast to all the destinations simultaneously. The same is true of the video and document updates. The destination addresses is followed by the actual variable length data of the data packet in field 78.

System Overviews

A block diagram of a multiple media communication system transmitter is shown in FIG. 7A. A packet with priority 20 is generated 708 from audio data source 702. A packet with priority 50 is generated 710 from video data source 704. A packet with priority 180 is generated 712 from text/graphics data source 706. A WriteQueue 716 (a buffer memory for storing packets to be sent) is provided for holding packets to be transmitted over the communication channel 718. Control 714, responsive to packet generation, 708, 710, 712 places the packets in the WriteQueue 716 in order of packet priority. In hardware, a queue maybe a FIFO. In software, WriteQueue 716 is a linked list of packet containers with pointers to the next and previous packet containers. Since the Writequeue 716 is an ordered list, adding a new entry is achieved by modifying two pointers to add the new entry to the list in the proper order.

A block diagram of a multiple media communication system receiver is shown in FIG. 7B. Two substantially similar receivers, one for caller 2 and another for caller 3 are illustrated. Both callers are respectively connected to a broadcast communication channel 720, 746. A ReadQueue 722, 724 (a buffer memory for storing packets) receives packets for processing. A control means 726, 728 selects packets to be processed based on the packet priority. A multi-tasking control 730, 738 processes data-packets in accordance with assigned priorities. As indicated, audio packets have the highest priority and are processed first. Other packets are processed in accordance with priority in a multi-tasking environment which balances speed of execution among the different priority packets while making sure to complete all tasks. A variety of multi-tasking control techniques for completing multiple tasks simultaneously, giving priority to higher tasks, while devoting some system resources to complete the lowest priority tasks, are known to those skilled in the art.

Audio data playback is delayed in a delay 734, 742, as indicated above. Video data display is similarly delayed in delay 731, 739 to maintain synchronism between video and audio. The multi-task control 730, 738 sets the amount of delay (for both video and audio) in accordance with the predicted average delay of the communication channel 720, 746. Delayed audio is then displayed 736, 744 at the receiver for caller 2 and caller 3. Delayed video is simultaneous displayed 732, 740 at the receiver for caller 2 and caller 3. Furthermore, since callers 2 and 3 are both receiving the same packets broadcast by caller 1, both hear and view the same multimedia messages.

Multimedia communication is typically two way between all callers. It should be understood that caller 1, caller 2 and caller 3 all include the transmitter and receiver elements shown in FIGS. 7A and 7B. This does not mean, however, that all callers need to transmit or receive data. Each caller can choose to (or be required to) receive only or transmit only.

In operation, at caller 1 in FIG. 7A, successive multimedia data packets with assigned priority are generated 708, 710, 712 from respective multimedia sources 702, 704 and 706. As the packets are generated, each is placed 714 in priority order in a queue 716 and transmitted over a communication channel 718. If the channel capacity were unlimited, packets would be transmitted as soon as generated. However, in the normal case, generated packets may accumulate awaiting transmission because the communication channel capacity is limited. The present priority scheme assures that packets are transmitted in priority order with the highest priority packets transmitted first.

At the receiver, callers 2 and 3 in FIG. 7B both receive packets from the communication channel 720, 746. Received packets at callers 1 and 2, are processed in accordance with the received priority, to play back the received audio, video and display of the received text/graphics. Since both callers 2 and 3 receive the same packets, a three party videoconference call is created.

Continuity of audio playback is perceived as critical to a multimedia conference. Accordingly, audio packets, being assigned the highest priority, are sent as soon as possible, and at the receiver, are processed as soon as possible after receipt. Thus, audio packets tend to be delivered in the shortest time which the communication channel will allow.

The system of the present invention tolerates transmission errors inherent in a traditional packet switched system by discarding or retransmitting corrupted audio or video. For text files, the normal error detection and retransmission requests are used. Sound and video are distinguished from text or file data in that it is possible to tolerate some loss of sound and video and still maintain an acceptable quality. In the event of a detected error in the received audio or video packet, the receiver determines whether there is sufficient time to flag the error and request a retransmission, based on the predicted average delay time of the system. If there is not sufficient time, the corrupted packet is ignored. In such manner, network capacity is not wasted on retransmissions which will arrive too late and have to be discarded anyway. However, the lowest priority packets of text/graphics or computer file data which are not time dependent, are flagged for errors and retransmitted.

Object Oriented CPacketStream Streaming Method

Various types of streams are used to achieve multimedia communications. First, a connection stream provides the interface to the communication channel. Then, there is a media stream for each desired media. For example, there may be a video stream, an audio stream, a video and audio stream such as QuickTime, or a text/data/graphics stream representing files, graphic images of many types, or any other data required. The architecture is designed to support "drop in" streams for new kinds of collaborative data.

Figure 8:
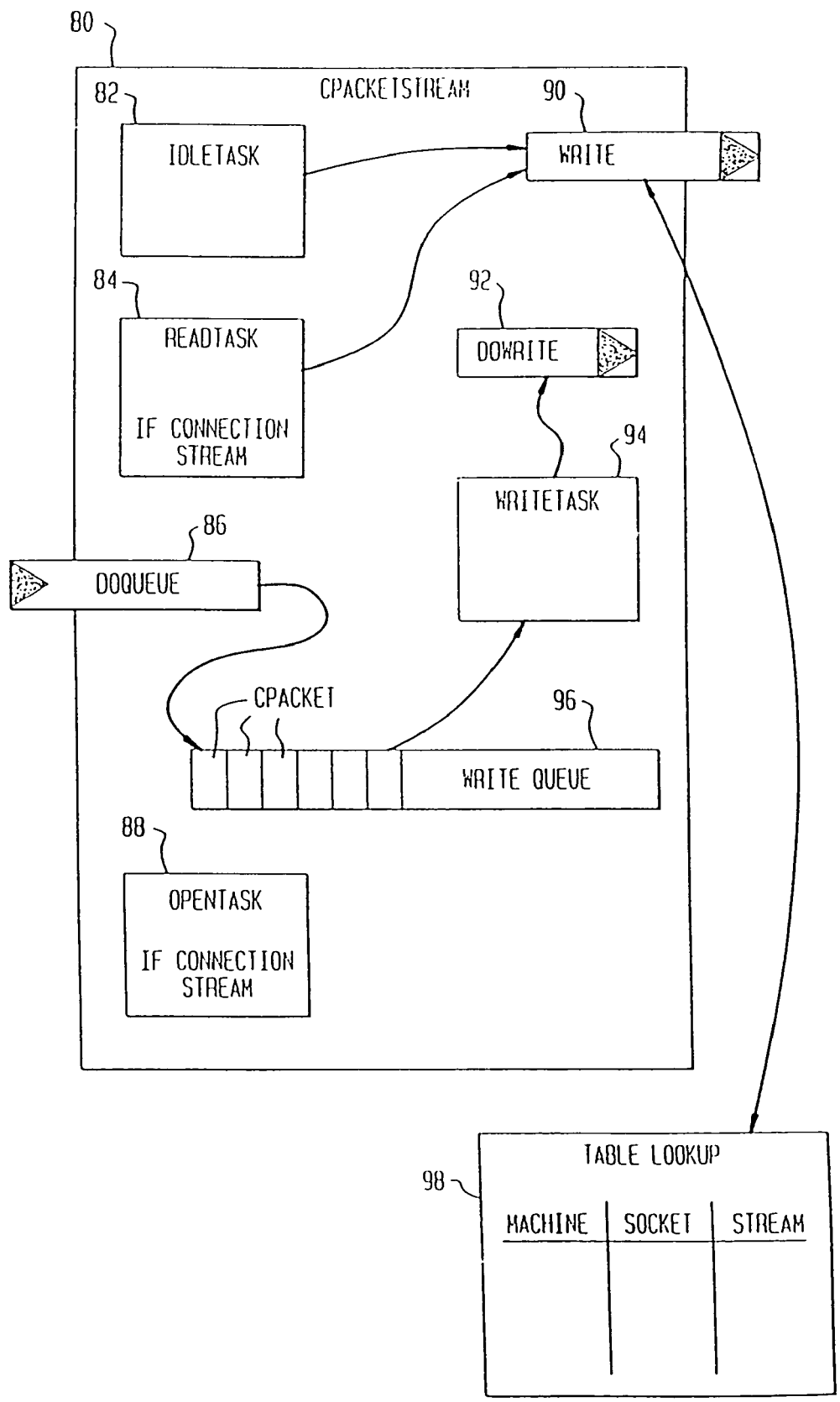
FIG. 8 is a block diagram of a method and apparatus for processing a data packet in accordance with the present invention.

The block diagram of FIG. 8 illustrates the method and apparatus for sending and receiving data packets, also termed CPackets. Each of the above methods and tasks is described in detail below, including pseudo code for realizing each of the methods and tasks on a general purpose digital computer. Although the preferred embodiment is described in terms of software operating in a Macintosh computer environment, it will be understood that the present multiple media communication system of the present invention may be implemented in hardware, such as in dedicated logic, microprogrammed bit slices, programmable arrays and the like.

CPacketStream 80 is a software component which is responsible for handling CPackets to establish communication channels between machines. Each CPacketStream 80 is composed of a set of routines (or methods) responsible to interact with CPackets. These methods are used in turn by a set of tasks running in each CPacketStream. The task types and methods (or routines) available for packet handling are summarized as follows and described in more detail below.

| TASKS: | |
|---|---|
| WriteTask | (prioritized multi-tasking of received CPackets) |
| ReadTask | (connection stream distributes received CPackets) |
| IdleTask | (send final packet and initial packet) |
| OpenTask | (open connection stream) |

| METHODS | |
|---|---|
| DoQueue | (puts a Cpacket in the WriteQueue) |
| DoWrite | (generates actual output from packet data) |
| DoIdle | (idle between packets) |
| Write | (lookups destination and calls DoQueue) |
| WriteDone | (acknowledges receipt of packet) |
| WriteQueue | (A buffer containing CPackets in priority order) |
| ReadQueue | (A buffer containing CPackets in received order) |

CPacketStream::WriteTask 94

The WriteTask 94 is responsible for distributing packets contained in the WriteQueue 96 in each CPacketStream 80. The priority of this task is at least as high as the packet it is currently handling. This task is in a loop currently scanning the WriteQueue 96, if the queue is empty then the task will sleep. The CPacketStream::DoQueue method will put a CPacket into the WriteQueue 96, and wake the WriteTask 94 up. Therefore, the WriteTask 94 will be the one displaying or playing the packets.

```
CPacketStream::WriteTask
    if a packet in WriteQueue
        call DoWrite for that packet to handle data
    end
end
```

CPacketStream::ReadTask 82

The ReadTask 84 is responsible for reading CPackets from a particular channel, and redistributing among CPacketStreams 80 in that machine. This type of task is only appropriate for a connection (media) CPacketStream 80. (In a way it is similar to the WriteTask 94, serving a WriteQueue 96, but in the reverse direction, and corresponding to receiving data packets in a ReadQueue)

```
CPacketStream::ReadTask
    if a new packet read
        write a new packet
    end
end
```

CPacketStream::IdleTask 82

The idle task 82 is responsible for generating and sending 'helo' (the initial packet) and 'kiss' (the final packet) CPackets. It is also responsible to execute idle time events in some particular streams. For example, a Communications Tool (from Apple Computer) needs to have an idle call every so often in order to handle a particular connection.

```
CPacketStream::IdleTask
    if initial packet not sent
        if initial packet not created
            create initial packet
        end
        sent initial packet
    end
    idle stream if necessary
    if stream should die
        if final packet not created
            create final packet
        end
        send final packet
    end
    if final packet sent and stream should die
        disable and delete the streams
    end
end
```

An OpenTask 88 is used when the connection is being first opened and the connection negotiated between callers. At that time, the contents of the table lookup 98, which defines media types and connection streams is determined. In addition to these tasks, there are several methods that are called by these tasks in order to communicate with the stream. These methods are:

CPacketStream::DoQueue 86

This is the method that is called in order to give a packet to a particular stream. Most streams will immediately write the packet to a WriteQueue 96, and activate the WriteTask 94 in order to handle that particular packet.

```
CPacketStream::DoQueue 86
    put packet into the write queue
    wakeup WriteTask
end
```

CPacketStream::DoWrite 92

The WriteTask 94 will call this routine to actually handle the packet's content. For a connection stream, this is the output routine of a CPacketStream 80 to the communication channel. For a video stream, this routine will decompress and display the video contained in a packet. For other media streams, the DoWrite 92 routine will carry out the appropriate process to get the data displayed, played or otherwise.

```
CPacketStream::DoWrite
    handle the packet's data
end
```

CPacketStream::DoIdle

This is the routine which can be used to idle the CPacketStream 80. Many streams can use this to do periodic tasks.

```
CPacketStream::DoIdle
    perform periodic task
end
```

CPacketStream::Write 90

This routine will look up in table 98 the destination address for each destination in the packet, and the call DoQueue 86 for each destination packet stream. Each DoQueue 86 can refuse the packet until a later time, and therefore the packet contains flags for each destination address such that a complete write will mark that address completely written. A packet therefore contains an active destination count (72 in FIG. 6).

```
CPacketStream::Write
    for all destination addresses in packet
        lookup destination stream in address table
        if alias entry and 'info' packet
            add writeAsRemoteInfo flag
        end
        if found
            call DoQueue method for destination stream
            if successful
                mark destination address write complete
            end
        else
            mark destination address write deleted
        end
    end
end
```

Data packet flow and handling through CPacketStream 80 is from calls to DoQueue 86 which will write a CPacket into the WriteQueue 96, and then activate WriteTask 94, which processes the Cpackets, and calls DoWrite 92 to distribute the Cpackets contained in the WriteQueue 96.

CPacketStream::WriteDone

This routine will be called to dispose of the packet generated by a certain stream. It can be used for synchronization. A connection stream has the option of calling WriteDone to transfer acknowledge packets on the outgoing connection. The CPacketStream owns the packet which it sends, until all other streams are done with the packet. At that time, the packet ready to be deleted. However, when a packet (e.g., video) is sent from one machine on to another machine, such as between an ethernet LAN (local area network) and a telephone modem, the packet (e.g., the video) is not actually being used. In such circumstances, the originating connection stream should hold the packet, until all other connections have used this packet on the other machine(s). Synchronization of packet receipt is accomplished by returning an acknowledge packet when the WriteDone function of the connection stream is called at each machine which receives the packet. This is an additional form of communications between machines to reinforce the normal packet communications. "Acknowledge" packets have the same priority as the information packets, the lowest packet priority.

Streaming Algorithm

Figure 9:
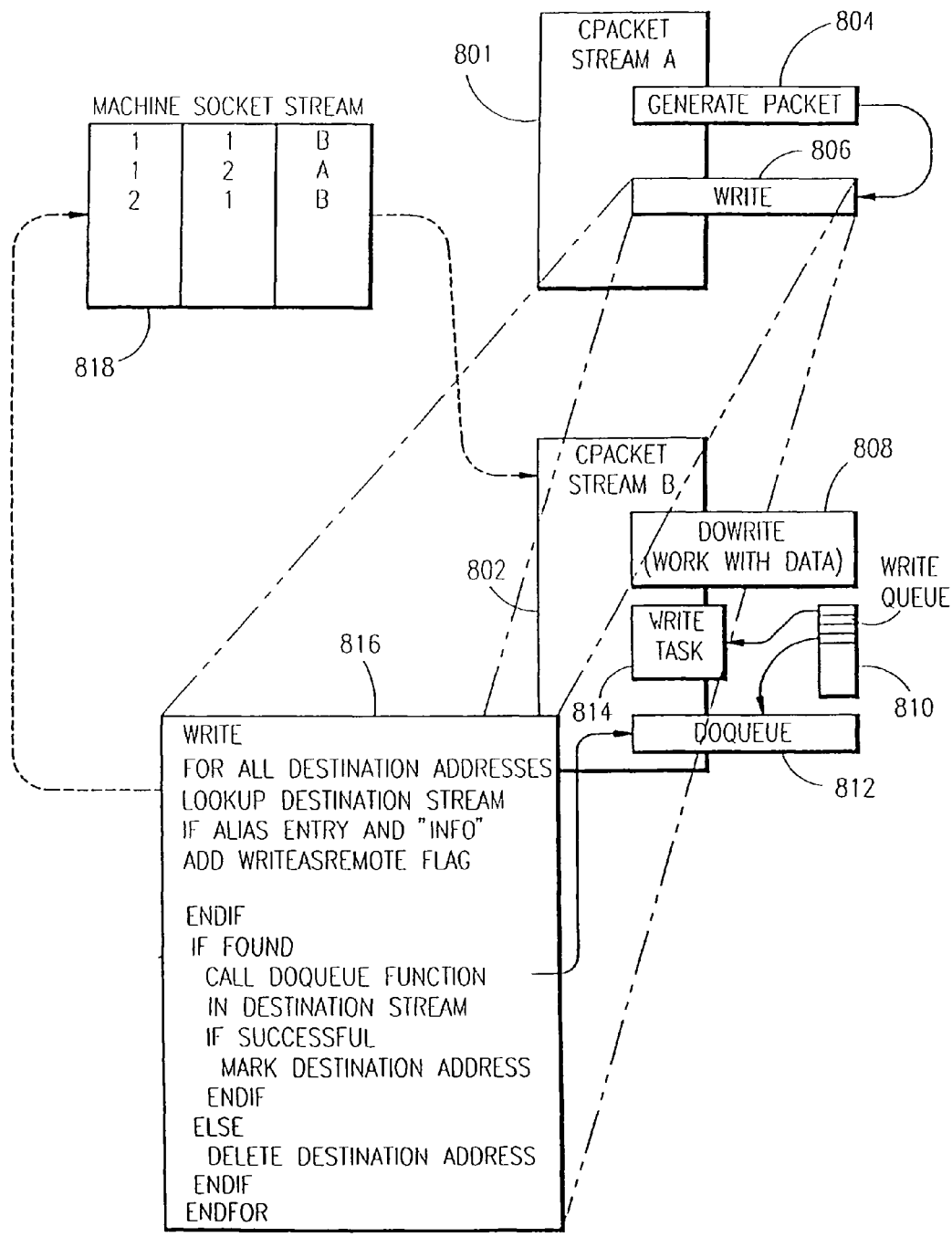
FIG. 9 is a block diagram illustrating the sequence of operation of a method and apparatus for processing data packets in accordance with the present invention.

A generalized representation of the use of the present streaming algorithm is shown in the block diagram of FIG. 9. Two CPacketStreams, CPacketStream A, 801 and CPacketStream B, 802 are shown. By way of example, if CPacketStream A was a connection stream, then CPacketStream B would be a media stream, such as a video stream. On the other hand if CPacketStream A was a video stream, such as from a frame grabber, then CPacketStream B would be a connection stream. In general, there is one stream for each type of media, plus one stream for each connection. That is, a separate connection stream is used for each caller. Thus, for a two way conference with one other caller, there is one connection stream, while for a three way conference there are two connection streams, one for each of the other two callers. In an alternate embodiment, such as may be used with future higher speed communication systems, a single connection stream may be used with more than one caller.

FIG. 9 also shows a lookup table 818 which is filled in when each stream is established for keeping track of the destination of the various packets. In operation, a packet is generated 804 and the Write function 806 is called. The pseudo code 816 for the Write function 806 contains a reference to a lookup to table 818, which returns an address to CPacketStream B, 802. CPacketStream B, 802 calls DoQueue 812, which writes the CPacket to WriteQueue 810. WriteTask 814 is activated to process the CPacket, which calls DoWrite 808 to generate the output routine of a CPacketStream 80 to the communication channel, or other appropriate media output.

Figure 10:
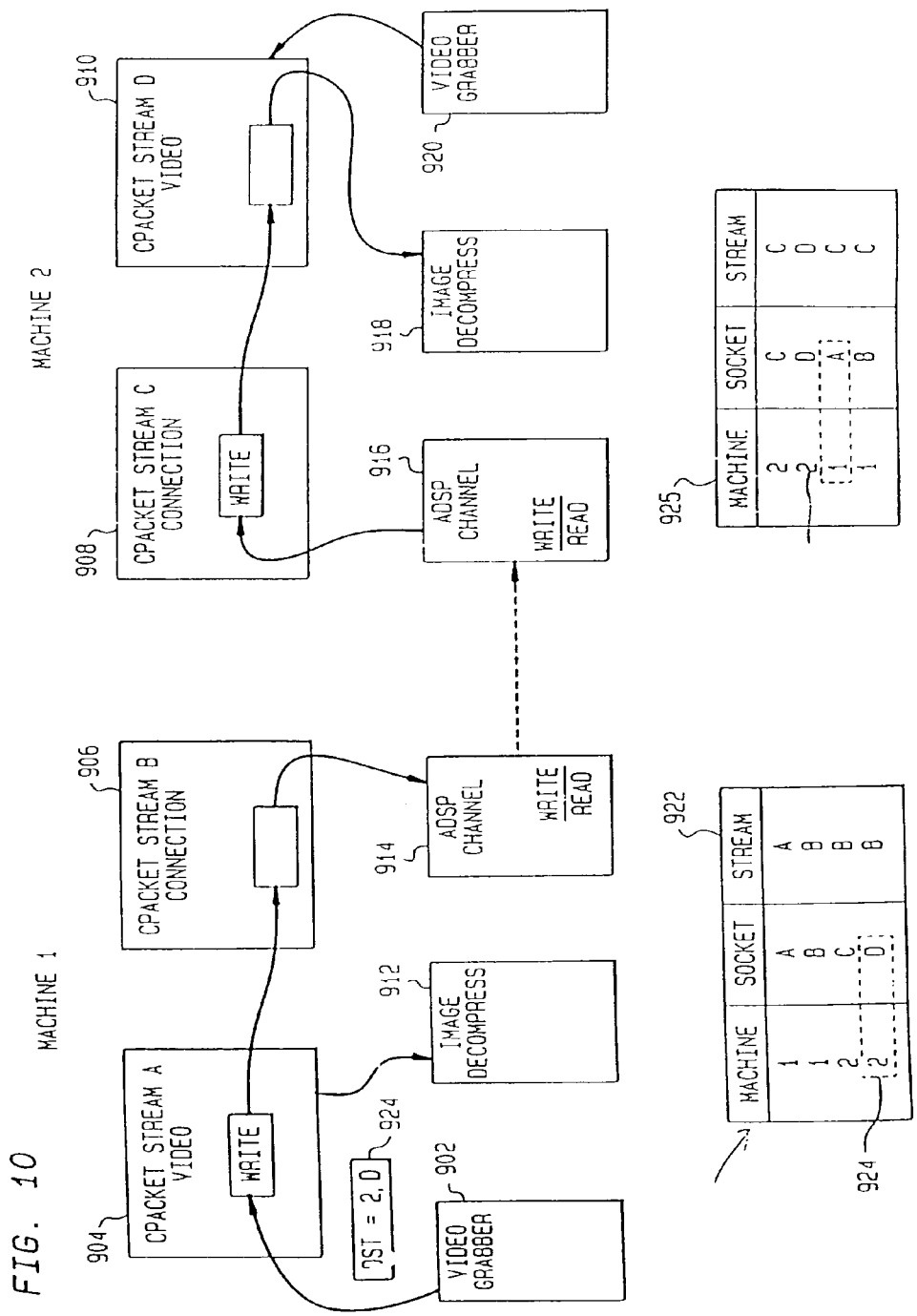
FIG. 10 is a block diagram of a method and apparatus for establishing a connection for specific media between callers used in conjunction with the present invention.

FIG. 10 illustrates the use of lookup tables to generate destination addresses from connection information between two given callers. By way of example, assume that CPacketStream A, 904 is a video stream connected to frame grabber 902 and image decompressor 912 at machine 1. A machine 2, CPacketStream D, 910 is also a video stream connected to a frame grabber 920 and image decompressor 918 at machine 2. Then, CPacketStream B, 906 is a connection stream coupled to a communication channel interface 914, such as for example a transmission source for an AppleTalk Data Streaming Protocol (ADSP) device. CPacketStream C, 908 is a connection stream coupled to a communication channel interface 916, shown as the receiving side of an AppleTalk Data Streaming Protocol device. Machine 1 uses table 922 to lookup the destination stream address 2,D for packets generated using data from video grabber 902. Similarly, machine 2 uses lookup table 925 to lookup the destination stream address 1,A for packets generated using data from video grabber 920.

Packet Acknowledgement

Figure 11:
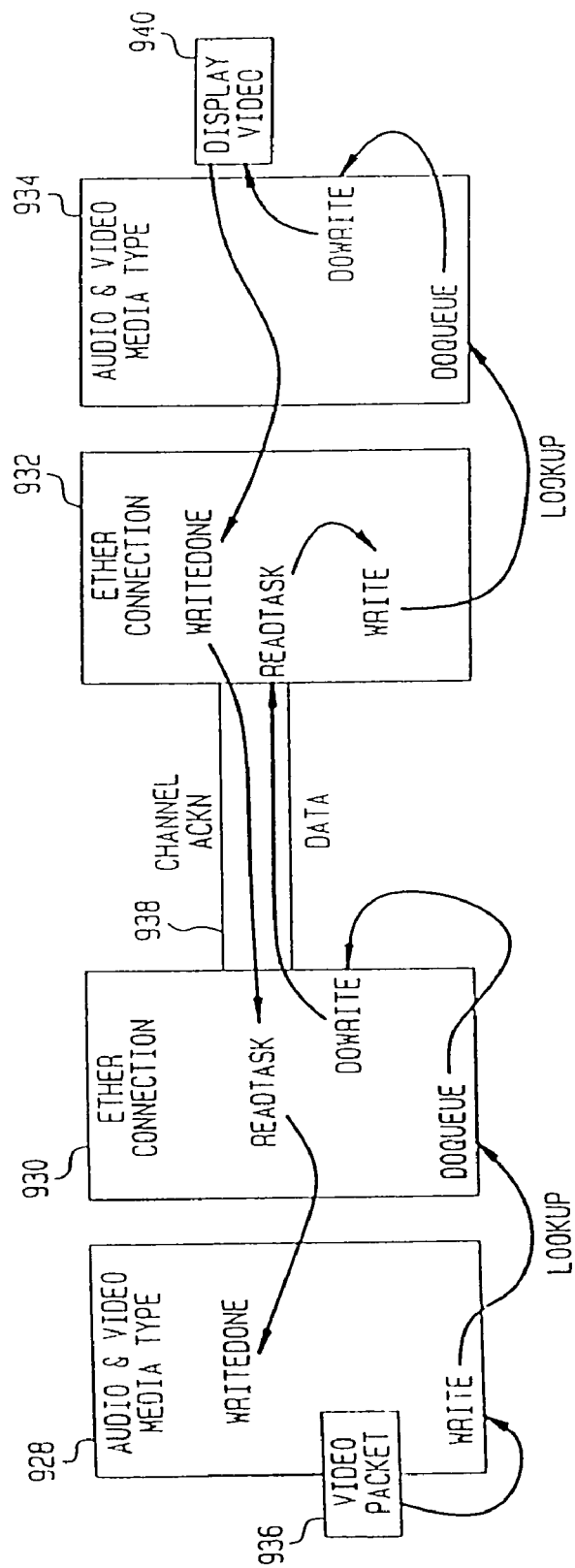
FIG. 11 is a block diagram illustrating the sequence of data packet flows with optional acknowledgement handshake packets.

A block diagram illustrating the use of an optional acknowledgement packet is shown in FIG. 11. A media stream 928, responsive to a video packet 936, calls the Write function, which through the appropriate lookup table, calls the DoQueue and DoWrite functions of connection stream 930, an ethernet connection stream. The video packet is transmitted on the ethernet communication channel 938 and received by the ReadTask and Write functions of connection stream 932. Thereafter, the DoQueue and DoWrite functions of media stream 934 are called through the appropriate lookup table which displays the data on video display 940.

The communication channel LAN protocol typically supports lower level acknowledgment functions. For example, it is known by the transmitting caller that the packet was received over the clear communication channel 938. Otherwise, the LAN protocol (at the ADSP level for example) would have returned an error indication. In addition to the acknowledge at the LAN protocol level, an acknowledge packet is generated when the received data is played (i.e., when the video data is displayed) in order to provide end to end synchronization information. The WriteDone function of connection stream 932 generates such acknowledge packet for return transmission across communication channel 938.

Back at the originating transmitting caller, the ReadTask function of connection stream 930, calls WriteDone routine of media stream 928 to process the acknowledge packet. The receipt of an acknowledge packet also provides an indication of system delay for the media type of media stream 928, in this example, a video packet. The acknowledge packet contains a recorded time indicating when the video packet was actually used. Comparison of the recorded transmission time with the received recorded display time, provides a measure of the end to end system delay.

Prioritized Data Packet Processing

Figure 12:
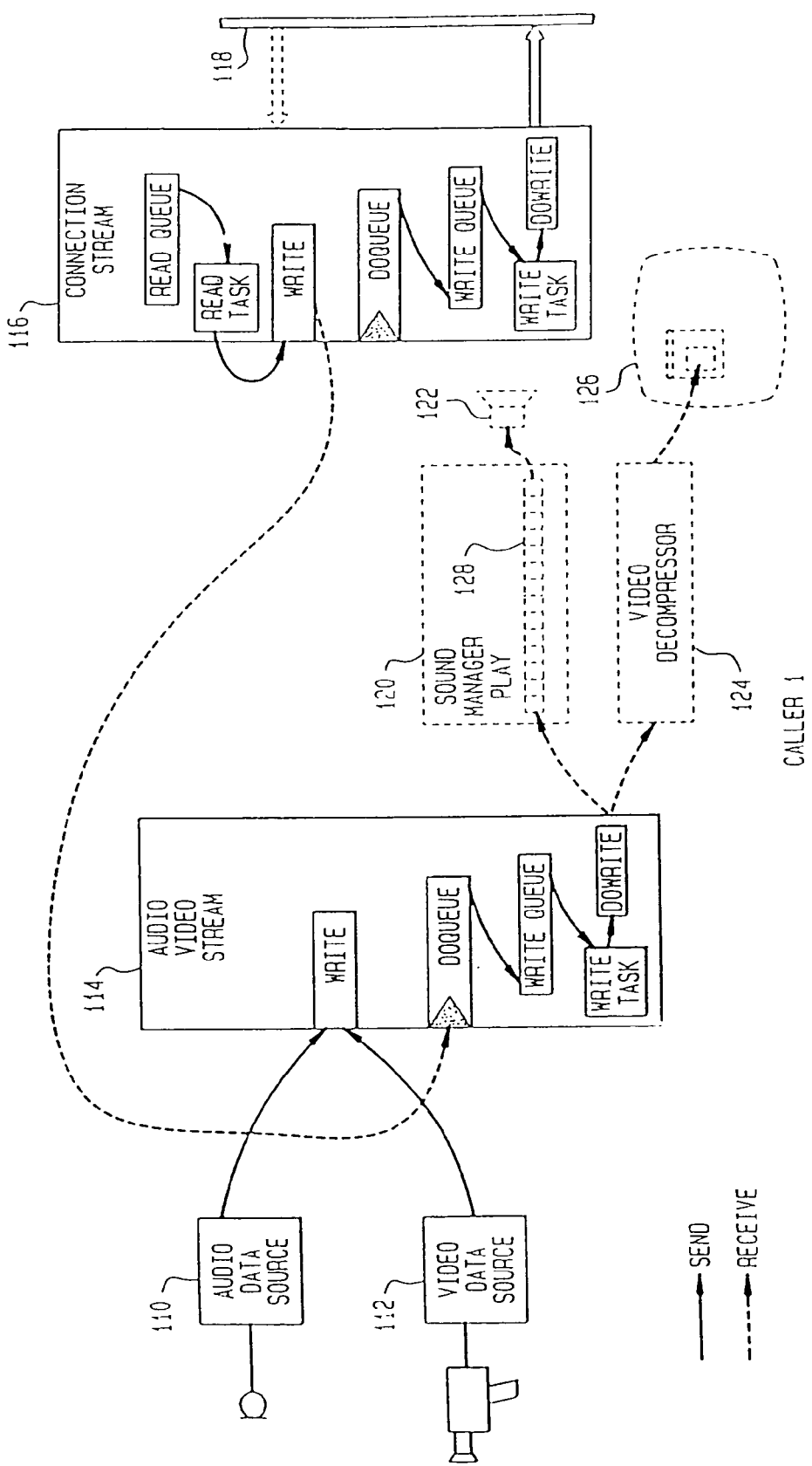
FIG. 12 is a block diagram of a multiple media digital communications system for sending and receiving multiple media for a first caller in accordance with the present invention.
Figure 13:
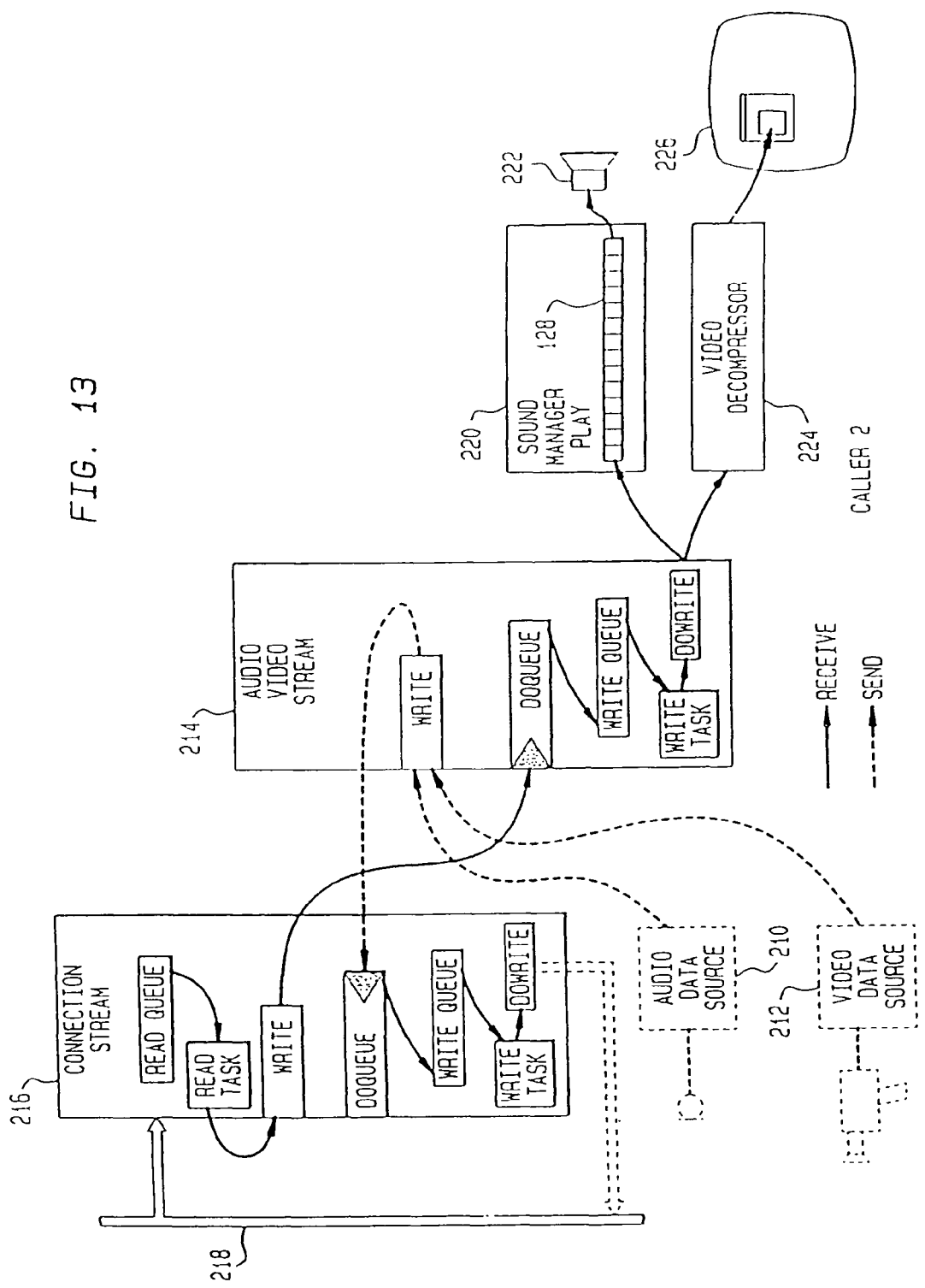
FIG. 13 is a block diagram of a multiple media digital communications system for receiving and sending multiple media for a second caller in accordance with the present invention.

A system block diagram is illustrated in FIGS. 12 and 13. FIG. 12 shows the transmission elements in solid lines and the receive elements in dotted lines. FIG. 13 shows the receive elements in solid lines and the transmit elements in doted lines.

In FIG. 12, and audio data source 110 and video data source 112 are coupled through audio/video stream 114 and connection stream 116 to data communication channel 118. In FIG. 13, data communication channel 118 is coupled to connection stream 216, and then to audio/video stream 214. Audio is played by sound manager 220, which includes a FIFO delay buffer 228. Video is played back by video decompressor 224 coupled to video display device 226.

For the return direction, FIG. 13 also shows audio data source 210 and video data source 212, coupled to the communication channel 218 through audio/video stream 214 and connection stream 216. At the transmission side in FIG. 12, audio is played by sound manager 120, which includes a FIFO delay buffer 128. Video is played back by video decompressor 124 coupled to video display device 126.

In operation in FIG. 12, data generated by audio source 110 and video data source 112 are placed into packets in audio/video stream 114, and forwarded to connection stream 116. The connection stream arranges the available packets in priority order before transmission on the network communication channel 118. Once transmission of a packet has begun, however, it is typically not interruptable. For example, if a video packet represents a video frame update, and the video packet transmission has started, no audio packet can be sent until the current packet is completed. If it is desired to improve audio transfer, the video frame update may be divided into smaller sub-frame packets. Then, an audio packet will be inserted during transmission of a complete video frame update, i.e., by insertion between sub-frame packets forming the video frame update.

In FIG. 13, data packets received by connection stream 216 are distributed to the audio/video stream 214. Audio data packets, having a higher priority represent a higher priority task. Thus, the sound manager 222 is given priority over the video decompressor 224. As indicated above, delay buffer 228 is set equal to the predicted average packet transmission delay of the communication system. Alternatively, the delay provided by delay buffer 228 is dynamically adjustable according to system delay as measured by time reported by return message packets or acknowledge packets. Audio playback is slowed or accelerated in order to shrink or grow the difference in time between the sender and receiver.

Additional media types, such as file text or screen documents may be added to the block diagrams of FIGS. 12 and 13 as additional inputs to the Write function of stream 114 in FIG. 12 and additional outputs of stream 214 in FIG. 13. In sharing collaborative documents, one member of the conference may be running the application such as a word processor or spreadsheet, and the others viewing a screen only. Alternatively, one member of the conference may be running the application, but the keystrokes of the others are transmitted back to the one member as text data. In such manner, conference members may each have direct input into the collaborative application.

As indicated, the preferred embodiment of the present invention is in software running on a Macintosh computer. A software embodiment has the advantage of being hardware independent, capable of working with any available media source, and across any available communication system. In addition, CPacketStream tasks and methods are shared by various connection streams and media streams. It is noteworthy that the present system achieves multimedia conferencing in a uniprocessor architecture.

Alternative embodiments of the present multimedia communication system include multi-processor architectures where the multi-tasking of received multimedia data packets may be replaced by parallel processing, or in special purpose hardware. In dedicated hardware, each CPacketStream could be a special purpose microprogrammed integrated circuit, where one chip would be required for each media type, and for each connection.

Figure 14:
FIG. 14 is a first configuration of the present invention for conducting a standard videoconference call over an ethernet network.
Figure 15:
FIG. 15 is an alternate configuration of the present invention for conducting a standard videoconference call with collaborative data over an ethernet network.

FIGS. 14 through 18 illustrate the various capabilities of the present system of multiple media digital communication. FIG. 14 illustrates a standard video call of the type shown in FIG. 2 over an ethernet network of the type illustrated. FIG. 15 illustrates a video call with collaborative data over an ethernet network of the type illustrated on the screen in FIG. 3. This configuration is contemplated as the most common type of multimedia call.

Figure 16:
FIG. 16 is an alternate configuration of the present invention for leaving a recorded multimedia message of a videoconference call with collaborative data over an ethernet network.

FIG. 16 illustrates a one way video/audio call with collaborative data over an ethernet network. The data is one way because first party did not answer, but that party was configured to accept messages. The received data is recorded in memory or on disk and played back later, thus creating a multimedia message answering machine. In the message record mode, system delays are not limiting because the message does not have to be recorded in real time; the only requirement is to play it back in real time. The message is recorded on one machine, and sent as a complete message file to the other machine, and there stored on the drive.

Figure 17:
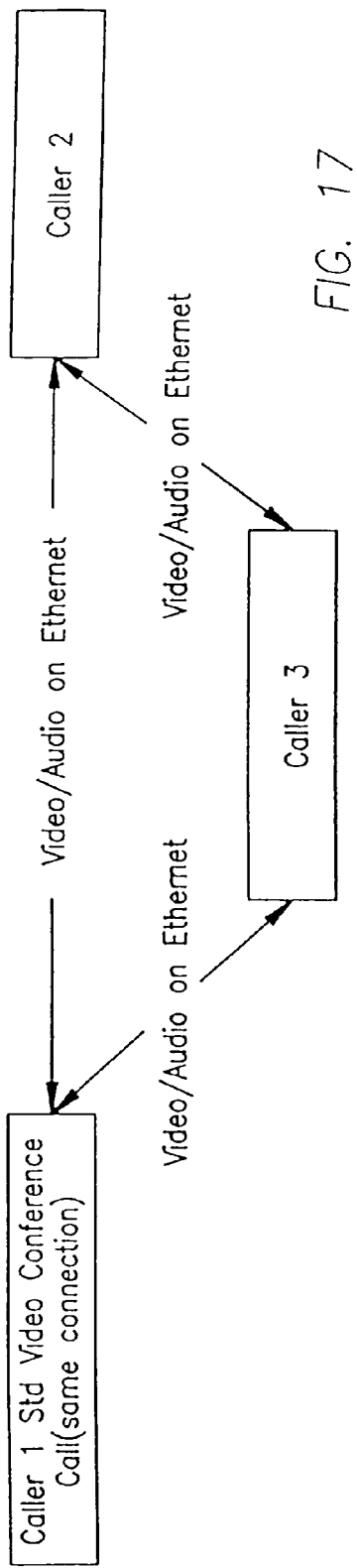
FIG. 17 is a three caller multimedia conference call in a system in accordance with the present invention.
Figure 18:
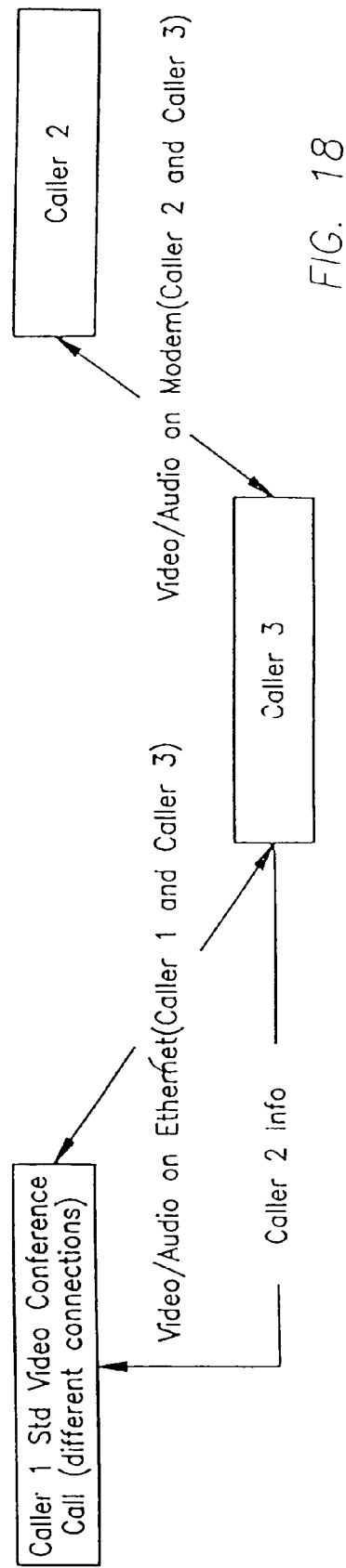
FIG. 18 is an alternate embodiment of a three caller multimedia conference call in a system using both ethernet and a telephone modem in accordance with the present invention.

A three way videoconference call is illustrated in FIG. 17. Caller 1, caller 2 and caller 3 are connected over an ethernet communication system. Each caller broadcasts multimedia digital packets to the other two callers. The connection may be expanded to more than three callers. Each caller will see a video image of all the other conferences on their screen in separate windows, as well as hear the conversation and view collaborative data.

An alternate embodiment for a three way videoconference call is illustrated in FIG. 19. Two callers (1 and 3) are on ethernet. Another caller, 2 is connected by modem. Caller 3 links caller 1 to caller 2. To link callers 1 and 2, caller 3 rebroadcasts received data packets from caller 1 over ethernet, to caller 3 over modem, and vice versa.

What is claimed is:

1. An apparatus for communicating with remote processing machines over a network comprising a packet switched network, the apparatus comprising:
   a processor;
   an interface in data communication with said processor; and
   at least one connection routine operative to run on said processor and negotiate, with at least one of the remote processing machines a media type selection from a plurality of media types including audio, video and data, and to configure at least one media routine to process media packets received from and to be transmitted to said at least one of the remote processing machines in a bi-directional communication over said network;

wherein the apparatus is configurable to receive one-way multimedia messages from at least one remote processing machine via said interface; and one or more separate variable delay buffers for each selected media type, each variable delay buffer for varying a delay provided to a selected media type between the apparatus and the remote processing machines to a selected level.

2. The apparatus of claim 1, wherein at least one of said remote processing machines comprises a telephony device.

3. The apparatus of claim 2, wherein said at least one telephony device is coupled to said apparatus directly or indirectly via a circuit-switched network.

4. The apparatus of claim 1, wherein said apparatus is further adapted to assign a priority to each of said media packets, said media packets being transmitted from said apparatus in substantially said order of said assigned priorities.

5. The apparatus machine of claim 4, wherein said apparatus further comprises a queue for holding said plurality of media packets respectively corresponding to each of said plurality of media types prior to transmission, and said transmission of said plurality of media packets in substantially said order of said assigned priority further comprises:

placing successive ones of said plurality of media packets in said queue in order of said assigned priority; and transmitting the first media packet of said queue.

6. The apparatus of claim 1, wherein said media packets include video packets and audio packets.

7. The apparatus of claim 1, wherein said media packets include video packets, audio packets, and collaborative data packets.

8. The apparatus of claim 7, wherein said video packets are assigned a lower priority than said audio packets.

9. The apparatus of claim 7, wherein said collaborative data packets are assigned a lower priority than said video packets.

10. The apparatus of claim 1, wherein said one-way multimedia message comprises an audio/video call.

11. The apparatus of claim 1, further adapted to receive control signals comprising one or more messages sent from said at least one connection routine to respective connection routines of the remote processing machines.

12. The apparatus of claim 1, wherein said media type selection involves user interaction.

13. A method of operating an apparatus adapted to communicate with remote processing machines over a network comprising a packet switched network, the method comprising:

providing at least one connection routine operative to run on said apparatus;

using at least said at least one routine, negotiating with at least one of the remote processing machines a media type selection from a plurality of media types including audio, video and data, and configuring at least one media routine to process media packets received from and to be transmitted to said at least one of the remote processing machines in a bidirectional communication over said network;

configuring the apparatus to receive one-way multimedia messages from at least one remote processing machine; and allocating one or more separate variable delay buffers for each selected media type, each variable delay buffer for varying a delay provided to a selected media type between the apparatus and the remote processing machines to a selected level.

14. The method of claim 13, wherein at least one of said remote processing machines comprises a telephony device.

15. The method of claim 14, wherein said at least one telephony device is coupled to said apparatus directly or indirectly via a circuit-switched network.

16. The apparatus of claim 13, wherein said method further comprises assigning a priority to each of said media packets; and transmitting said media packets from said apparatus in substantially said order of said assigned priorities.

17. The method of claim 13, wherein further comprising queuing said plurality of media packets respectively corresponding to each of said plurality of media types prior to transmission, assigning a priority to each of said plurality of media packets, and transmitting said plurality of media packets in substantially an order of said assigned priority by:

placing successive ones of said plurality of media packets in a queue in order of said assigned priority; and transmitting the first media packet of said queue.

18. The method of claim 13, wherein said media packets include video packets and audio packets.

19. The method of claim 13, wherein said media packets include video packets, audio packets, and collaborative data packets.

20. The method of claim 19, wherein said video packets are assigned a lower priority than said audio packets.

21. The method of claim 19, wherein said collaborative data packets are assigned a lower priority than said video packets.

22. The method of claim 13, wherein said configuring to receive one-way multimedia messages comprises configuring to receive at least one audio/video call.

23. The method of claim 13, further comprising receiving control signals comprising one or more messages sent from said at least one connection routine to respective connection routines of the remote processing machines.

24. The method of claim 13, wherein said media type selection involves user interaction.

25. An apparatus for communicating with a remote processing machine over a network comprising at least a packet switched network, the apparatus comprising:

a processor; and at least one connection routine operative to run on said processor and accept, modify, or deny a communication attempt from the remote processing machine;

wherein a modification of the communication attempt comprises a media type selection using a media type selection protocol that supports the description of media types including audio, video and data;

wherein the media type selection protocol selects a media packet in a first priority range before selecting any media packet in a second priority range and selects the media packet in the second priority range according to a relative priority of the media packet; and wherein the apparatus is configurable to negotiate the receipt of a one-way multimedia message.

26. The apparatus of claim 25, wherein the one-way multimedia message is a pre-recorded message file.

27. The apparatus of claim 25, wherein receipt of the one-way multimedia message occurs not in real-time.

28. The apparatus of claim 25, wherein the one-way multimedia message comprises audio and video.

29. The apparatus of claim 25, wherein the one-way multimedia message comprises audio and text data.

30. The apparatus of claim 25, wherein the one-way multimedia message comprises audio and graphics data.

31. The apparatus of claim 25, wherein the one-way multimedia message comprises video and text data.

32. The apparatus of claim 25, wherein the one-way multimedia message comprises video and graphics data.

33. The apparatus of claim 25, wherein the apparatus is configurable to negotiate the receipt of multimedia data for temporary storage and playback of one-way multimedia message.

34. The apparatus of claim 25, wherein the one-way multimedia message is delivered as a multimedia message file and is stored in a memory in the apparatus.

35. The apparatus of claim 25, wherein the one-way multimedia message may be played back by the apparatus.

36. Integrated circuit apparatus adapted to communicate with a remote processing machine via a network apparatus, said integrated circuit adapted for direct or indirect data communication with said network apparatus, comprising:
 a digital processor;
 a routine running on said processor adapted to negotiate with the remote processing machine via the network apparatus a selection of at least one media type using a media type selection protocol that supports the description of a plurality of media types including audio, video and data, and to cause said network apparatus to be configured, according to said selection, to process media data packets received from and to be transmitted to said remote processing machine over a packet switched or circuit switched network using one or more communication channels, said one or more channels in communication with a single connection stream that includes packets of at least one media stream set up for each of said at least one media type; and
 one or more separate variable delay buffers for each of said at least one media type, each variable delay buffer for varying a delay provided to a selected media type between the apparatus and the remote processing machines to a selected level.

37. The integrated circuit apparatus as claimed in claim 36, wherein said media data packets include video packets, audio packets, and collaborative data packets.

38. The apparatus as claimed in claim 36, wherein said media type selection is performed by either a user or by a routine running on said remote processing machine.

39. The apparatus as claimed in claim 36, wherein said one or more communication channels providing indeterminate system delays and bandwidth limitations that give rise to indeterminate packet loss, and said routine is configured to operate in an indeterminate packet loss environment.

40. An integrated circuit for use in a telephonic device, the telephonic device being adapted for signal communication with network apparatus adapted to couple into communication a remote processing machine and the telephonic device, comprising:
 a processor;
 a routine running on said processor for negotiating, with at least one of the remote processing machine and the network apparatus, a selection of at least one media type from a plurality of media types including audio, video and data, said routine configured to cause the network apparatus to process media data packets received from and to be transmitted to said remote processing machine over a packet switched network;
 wherein the routine processes all media data packets in a first priority range before processing any media data packets in a second priority range and processes the media data packets in the second priority range according to a relative priority of the media data packets; and
 wherein the integrated circuit is configured to be placed into signal communication with the remote processing machine, said network apparatus configured to rebroadcast said selection via a non-packet switched network.

41. A telephonic device adapted for signal communication with network apparatus, said network apparatus adapted to couple into communication a remote processing machine and the telephonic device, comprising:
 an integrated circuit comprising:
  a processor; and
  a routine running on said processor for negotiating, with at least one of the remote processing machine and the network apparatus, a selection of at least one media type from a plurality of media types including audio, video and data, said routine configured to cause the network apparatus to process media data packets received from and to be transmitted to said remote processing machine over a packet switched network;
 wherein the routine processes all media data packets in a first priority range before processing any media data packets in a second priority range and processes the media data packets in the second priority range according to a relative priority of the media data packets; and
 wherein the telephonic device is configured to be placed into signal communication with the remote processing machine, said network apparatus configured to rebroadcast said selection via a non-packet switched network.

42. Computerized apparatus adapted to communicate with a remote processing machine via a network apparatus, said computerized apparatus being adapted for direct or indirect data communication with said network apparatus, comprising:
 an integrated circuit comprising:
  a digital processor;
  a routine running on said processor adapted to negotiate with the remote processing machine via the network apparatus a selection of at least one media type using a media type selection protocol that supports the description of a plurality of media types including audio, video and data, and to cause said network apparatus to be configured, according to said selection, to process media data packets received from and to be transmitted to said remote processing machine over a packet switched or circuit switched network using one or more communication channels, said one or more channels in communication with a single connection stream that includes packets of at least one media stream set up for each of said at least one media type; and
 wherein the routine processes all media data packets in a first priority range before processing any media data packets in a second priority range and processes the media data packets in the second priority range according to a relative priority of the media data packets.

* * * * *